(12) United States Patent
Harwood et al.

(10) Patent No.: US 9,562,523 B2
(45) Date of Patent: Feb. 7, 2017

(54) WOBBLE DRIVE MECHANISM

(71) Applicant: JM Harwood LLC, Huntsville, AL (US)

(72) Inventors: Michael R. Harwood, New Market, AL (US); Thomas Bender, Huntsville, AL (US)

(73) Assignee: JM Harwood LLC, Huntsville, AL (US)

( * ) Notice: Subject to any disclaimer, the term of this patent is extended or adjusted under 35 U.S.C. 154(b) by 1064 days.

(21) Appl. No.: 13/740,190

(22) Filed: Jan. 12, 2013

(65) Prior Publication Data
US 2014/0093411 A1 Apr. 3, 2014

Related U.S. Application Data

(60) Provisional application No. 61/708,592, filed on Oct. 1, 2012.

(51) Int. Cl.
| | |
|---|---|
| *F04B 9/02* | (2006.01) |
| *F16H 25/12* | (2006.01) |
| *F04B 1/12* | (2006.01) |
| *F04B 1/14* | (2006.01) |
| *F04B 9/04* | (2006.01) |
| *F16H 23/10* | (2006.01) |

(52) U.S. Cl.
CPC .............. *F04B 9/02* (2013.01); *F04B 1/128* (2013.01); *F04B 1/146* (2013.01); *F04B 9/04* (2013.01); *F16H 23/10* (2013.01); *F16H 25/125* (2013.01); *Y10T 74/18336* (2015.01)

(58) Field of Classification Search
CPC ........ F16H 23/10; F16H 25/125; F04B 1/128; F04B 1/146; F04B 9/042; B05B 9/0855; B05B 9/0413; B05B 3/008; B05B 11/0005; B05B 11/3001; B05B 11/3045; F01B 3/02
See application file for complete search history.

(56) References Cited

U.S. PATENT DOCUMENTS

| | | | |
|---|---|---|---|
| 4,197,884 A | 4/1980 | Maran | 141/383 |
| 4,442,977 A | 4/1984 | Beiswenger et al. | 239/322 |
| 5,562,560 A * | 10/1996 | Kanamaru | F16D 31/02 475/163 |
| 5,655,885 A | 8/1997 | Chung | 417/44.2 |
| 5,662,271 A | 9/1997 | Weston et al. | 239/321 |

(Continued)

*Primary Examiner* — Thomas E Lazo
*Assistant Examiner* — Abiy Teka
(74) *Attorney, Agent, or Firm* — James Richards

(57) ABSTRACT

A wobble drive mechanism for coupling a rotary motion to a reciprocating motion comprising a diagonal plate coupled to a rotary motion axis driving a wobble carrier having a flat side in sliding contact with the diagonal plate and a spherical side in contact with a spherical bearing recess. The wobble carrier has a bore containing at least one reciprocating drive shoe. The reciprocating drive shoe may be coupled to a piston operating within a cylinder. The reciprocating drive shoe may be free to move in the bore linearly and/or rotationally. In various embodiments, the reciprocating drive shoe comprises two or more components. In various embodiments the piston is coupled to the shoe via a fixed rod section and the fixed rod section terminates in, for example, a double cylindrical bearing T section or a spherical bearing. The reciprocating drive may operate various devices, for example, pump or motor devices.

24 Claims, 29 Drawing Sheets

(56) References Cited

U.S. PATENT DOCUMENTS

| | | | | |
|---|---|---|---|---|
| 5,716,007 | A | 2/1998 | Nottingham et al. | 239/332 |
| 6,116,472 | A | 9/2000 | Wanbaugh et al. | 222/340 |
| 6,554,211 | B1 | 4/2003 | Prueter et al. | 239/332 |
| 6,981,658 | B2 | 1/2006 | Streutker et al. | 239/337 |
| 7,302,883 | B2 * | 12/2007 | Lynn | F04B 27/0886 74/60 |
| 7,318,539 | B2 * | 1/2008 | Vitantonio | B05B 9/0861 222/333 |
| 7,467,752 | B2 | 12/2008 | Sweeton | 239/102.2 |
| 7,562,834 | B2 | 7/2009 | Hornsby et al. | 239/527 |
| 7,648,083 | B2 | 1/2010 | Hornsby et al. | 239/333 |
| 7,766,194 | B2 | 8/2010 | Boll et al. | 222/333 |
| D623,958 | S | 9/2010 | Schaeffer et al. | D9/685 |
| 7,922,105 | B2 | 4/2011 | Zagorsky | 239/340 |
| D653,541 | S | 2/2012 | Foster et al. | D9/448 |
| D653,542 | S | 2/2012 | Arminak | D9/448 |
| D653,946 | S | 2/2012 | Arminak | D9/448 |
| D653,947 | S | 2/2012 | Arminak | D9/448 |
| D656,832 | S | 4/2012 | Bowers et al. | D9/526 |
| D660,941 | S | 5/2012 | Perez et al. | D23/225 |
| D660,942 | S | 5/2012 | Hudson et al. | D23/225 |
| D662,179 | S | 6/2012 | Lin | D23/225 |
| 2004/0099751 | A1 | 5/2004 | Krestine et al. | 239/302 |
| 2006/0110265 | A1 * | 5/2006 | Lanfredi | F04B 1/146 417/269 |
| 2013/0164446 | A1 * | 6/2013 | Harwood | F04B 1/146 427/256 |

* cited by examiner

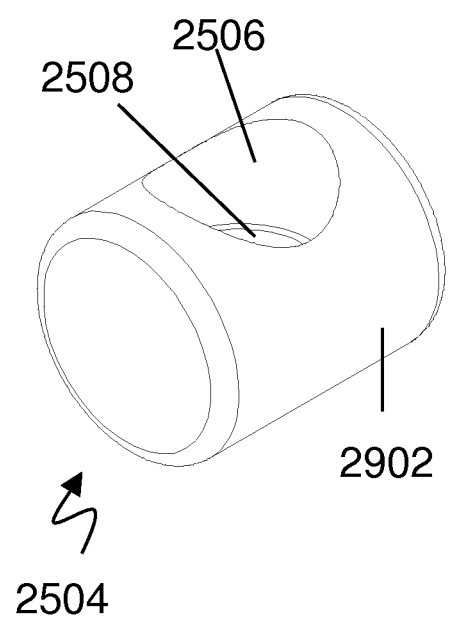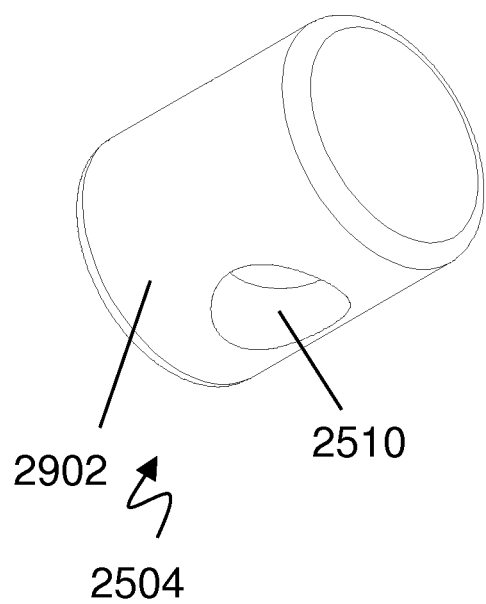
Fig. 29A
Fig. 29B

WOBBLE DRIVE MECHANISM

RELATED APPLICATIONS

This application claims the benefit under 35 USC 119(e) of provisional application 61/708,592 titled "Wobble Drive Mechanism" filed Oct. 1, 2012 by Harwood et al.; all of the above listed U.S. patent documents are hereby incorporated herein by reference in their entirety.

TECHNICAL FIELD

The present invention pertains generally to the field of mechanical drive systems, more particularly to systems utilizing rotation to reciprocating motion conversion mechanisms, such as pumps and motors.

BACKGROUND

Pumps and motors often utilize cylinders or diaphragms utilizing reciprocating motion. These cylinders are often coupled to rotational motion systems such as electric motors or wheels.

BRIEF DESCRIPTION

The present disclosure pertains to a wobble drive mechanism for coupling a rotary motion to a reciprocating motion comprising a diagonal plate coupled to a rotary motion axis driving a wobble carrier having a flat side in sliding contact with the diagonal plate and a spherical side in contact with a spherical bearing recess. The wobble carrier has a bore containing at least one reciprocating drive shoe. The reciprocating drive shoe may be coupled to a piston operating within a cylinder. The reciprocating drive shoe may be free to move in the bore linearly and/or rotationally. In various embodiments, the reciprocating drive shoe comprises two or more components. In various embodiments the piston is coupled to the shoe via a fixed rod section and the fixed rod section terminates in a double cylindrical bearing T section or a spherical bearing. The reciprocating drive may operate various devices, for example, pump or motor devices.

In a further variation, the reciprocating drive shoe comprises a shuttle and an end cap.

In a further variation, the wobble carrier is restrained from rotating around the rotary axis by lateral restraint of the connecting rod.

In a further variation, the reciprocating drive shoe is partitioned into two or more components; the two or more components collectively include a top bearing portion proximal to the wobble hub for coupling axial extension motion of the reciprocating motion, and further include a bottom bearing portion for coupling axial retracting motion of the reciprocating motion and further include an aperture for passing a connecting rod for coupling the reciprocating motion.

In a further variation, the two or more components of the reciprocating drive shoe are held in place for operation by walls of the wobble carrier bore and the coupling rod end coupling; wherein the walls of the wobble carrier bore prevent separation of the two or more components and the connecting rod end coupling prevents relative sliding of at least two of the two or more components.

In a further variation, the reciprocating drive shoe comprises two half shoe components.

In a further variation, the reciprocating drive shoe comprises a shuttle and an end cap.

In a further variation, the shuttle forms a through hole in the shuttle, the shuttle capturing the end cap within a portion of the through hole, the shuttle having a bearing surface for coupling to a coupling rod end coupling within the through hole, the shuttle forming an aperture portion of the through hole for receiving a coupling rod.

In a further variation, further including a piston coupled to the reciprocating drive shoe, the piston is coupled to the reciprocating drive shoe via a fixed rod section, the fixed rod section fixedly attached to the piston, and the fixed rod section terminating in a double cylindrical bearing T section.

In a further variation, further including a piston coupled to the reciprocating drive shoe, the piston is coupled to the reciprocating drive shoe via a fixed rod section, the fixed rod section fixedly attached to the piston, and the fixed rod section terminating in a spherical ball end coupling.

In a further variation, the spherical surface of the wobble carrier is based on a sphere having a center along the center axis of the wobble carrier bore.

In a further variation, the spherical surface of the wobble carrier is based on a sphere having a radius sufficient to include within the sphere the reciprocating drive shoe at a maximum travel range for the reciprocating drive shoe within the wobble carrier bore.

In a further variation, the spherical surface of the wobble carrier is interrupted to allow passage of the coupling rod through the spherical surface.

In a further variation, a spherical surface of the spherical recess allows passage of the coupling rod through the spherical surface of the spherical recess.

In a further variation, the spherical surface of the wobble carrier is based on a sphere having a radius greater than a radius or a width of the wobble carrier bore.

In a further variation, the sliding contact with the diagonal plate includes an anti friction pad.

Embodiments using the drive section for a fluid pump are disclosed. The drive may be used for pump or motor embodiments.

The mechanism is capable of coupling the rotary motion to both push and pull of the reciprocating motion without having return springs that apply a continuous preload. In a pump application, this may eliminate the need for return springs to retract the pistons and eliminates the forces and friction forces related to the return springs.

The wobble carrier is not attached by a typical shaft and bearing, but rather "floats" within the space between the diagonal drive and the spherical bearing seat. The arrangement allows for simple assembly, wide tolerances in the parts and permits significant wear.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 29A and FIG. 29B show a top front right, and bottom back left view the exemplary coupling shuttle of FIG. 25.

DETAILED DESCRIPTION OF THE PREFERRED EMBODIMENTS

Figure 1:
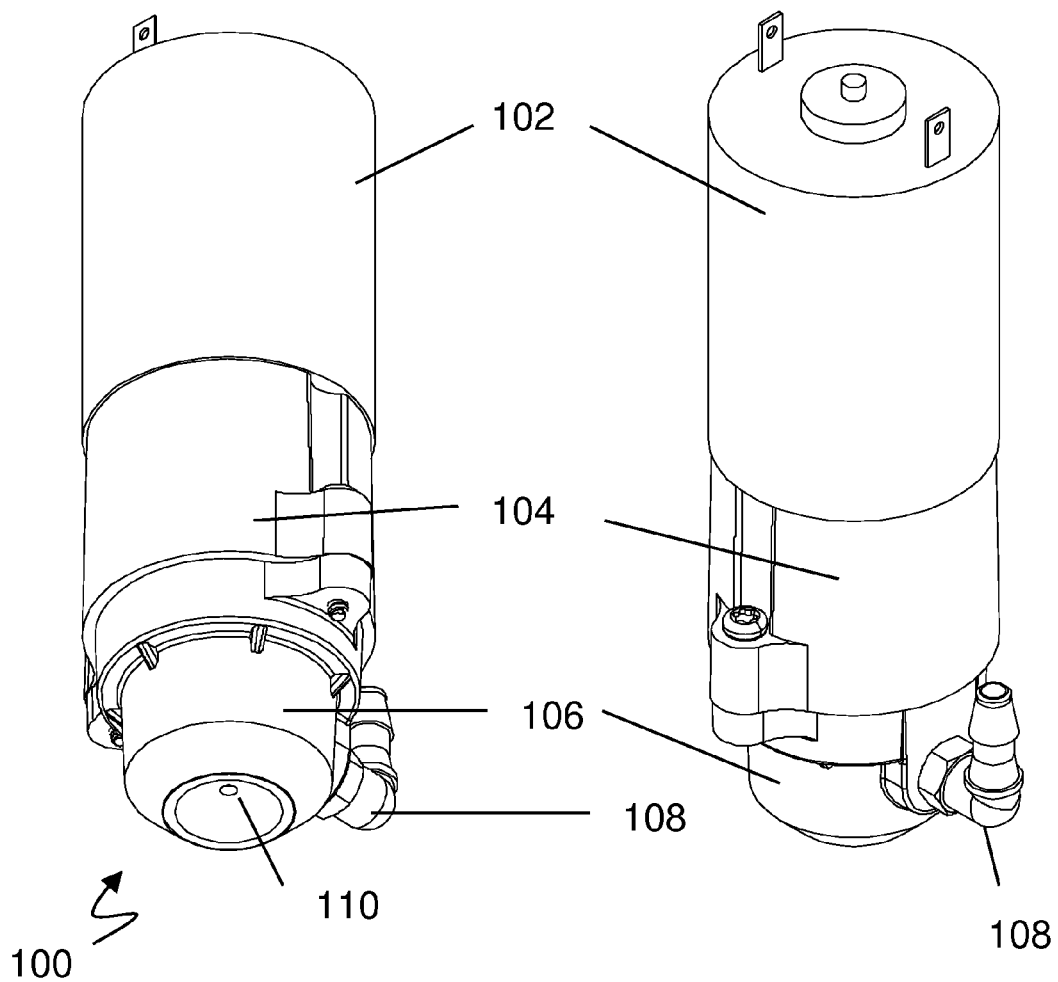
FIG. 1A and FIG. 1B are two different isometric views illustrating an exemplary integrated sprayer pump, nozzle, motor in accordance with the present invention.

FIG. 1A and FIG. 1B are two different isometric views illustrating an exemplary integrated sprayer pump, nozzle, motor in accordance with one embodiment of the present invention. Referring to FIG. 1, A motor 102 is coupled to a wobble drive section 104 that is coupled to a piston/nozzle section 106. A nozzle 110 and fluid input coupling 108 are shown.

Figure 2:
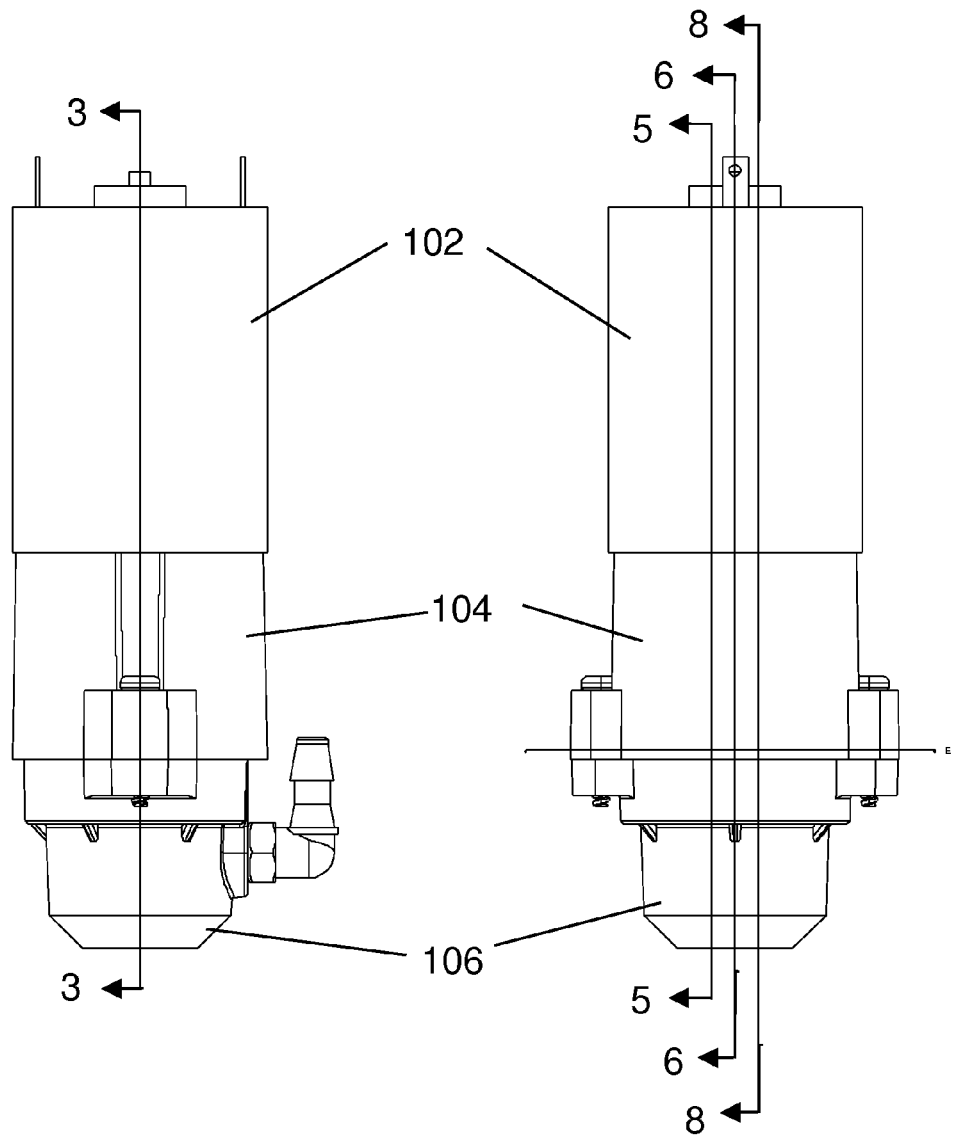
FIG. 2A and FIG. 2B are a side and front view, respectively of the sprayer of FIG. 1A.

FIG. 2A and FIG. 2B are a side and front view, respectively of the sprayer of FIG. 1A. FIG. 1A and FIG. 1B show locations of cross section views in subsequent figures.

Figure 3:
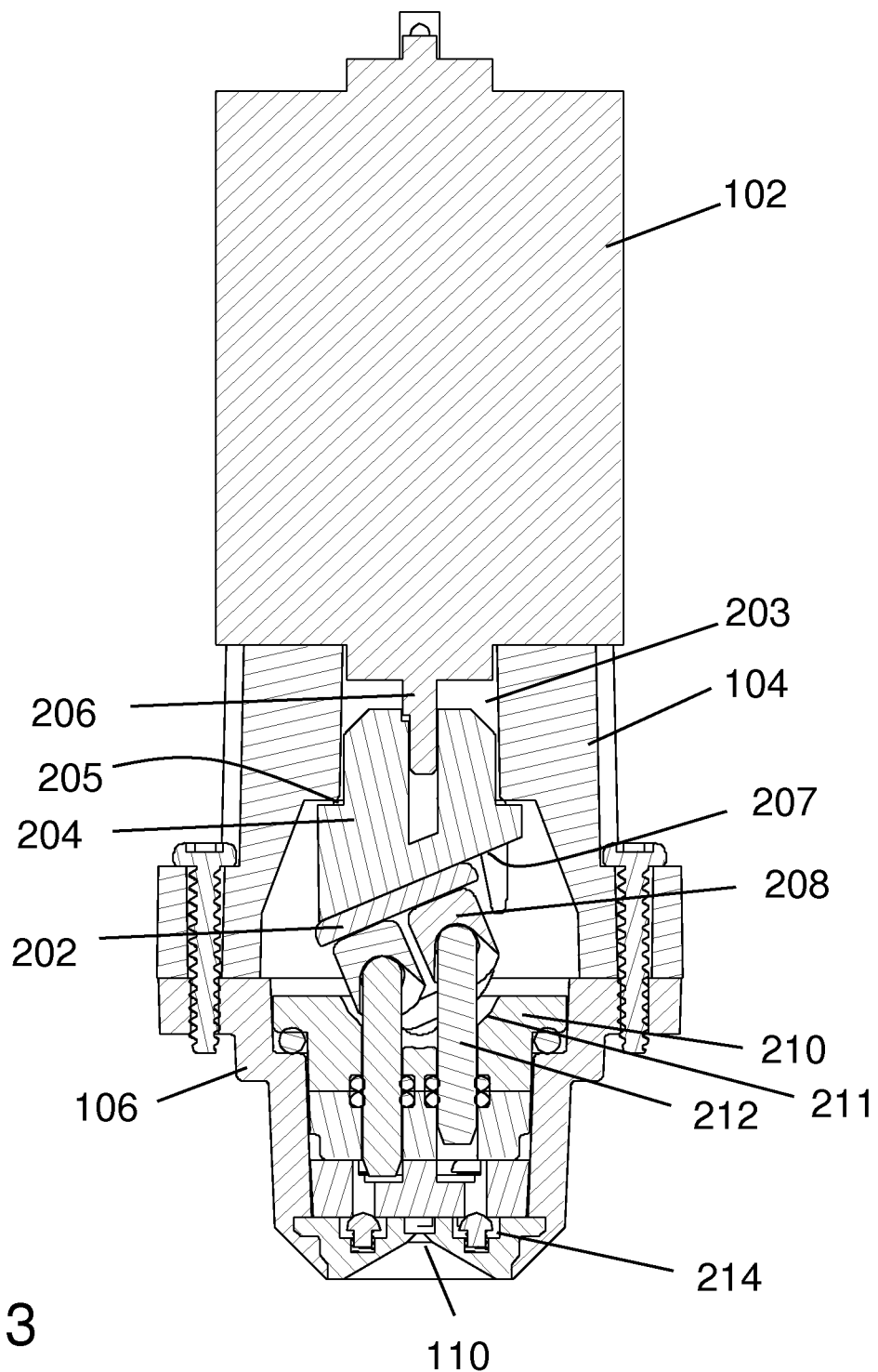
FIG. 3 is a cross section view of the exemplary sprayer as shown in FIG. 2A.

FIG. 3 is a cross section view of the exemplary sprayer as shown in FIG. 2A. The cross section passes through the center of the motor shaft and is in a plane cutting through two pistons. Referring to FIG. 3, the motor shaft 206 is coupled to the drive plate 204 to rotate the drive plate around the motor axis. In one embodiment the motor shaft 206 may not be attached to the drive hub 204, the drive hub 204 may be free to move axially on the motor shaft 206, being constrained laterally by the motor shaft 206. The motor shaft 206 may have a D shape or alternatively may have a spline shape or other shape for coupling to the drive plate hub 204. The drive plate 204 may be constrained laterally by the motor shaft. Alternatively or in addition, the drive plate may be constrained by a drive hub bore 203. The drive plate vertical position may be constrained by the drive hub waist band surface 205 in contact with a complementary surface in the drive housing 104. Bearings or anti-friction materials may be used to reduce friction. The drive hub has a diagonal surface 207 for driving the wobble carrier 202.

The wobble carrier 202 transfers the diagonal rotational drive of the diagonal drive plate 204 to a reciprocating motion to drive the pistons 212 by tilting or nutating within a spherical bearing 211 in response to the diagonal drive. The wobble carrier 202 carries two piston end cap shoes (alternatively referred to as reciprocating drive shoes) 208 that couple the nutation motion to the pistons 212. The piston shoes 208 permit two axis lateral rotation (tilting) of the wobble carrier 202 while constraining vertical linear motion to thereby drive the pistons vertically and allow tilting of the wobble carrier 202. The piston shoes 208 may also move axially in a bore (see FIG. 10A 1004) of the wobble carrier 208 to accommodate piston lateral motion constraint. In one embodiment, the center of a sphere defining the spherical bearing 211 may be on the center line (1008 FIG. 10) of the cylindrical bore 1004 of the wobble carrier 202. The bore 1004 and piston 212 shown are cylindrical; however, other shapes may alternatively be used.

The wobble carrier 202 has a generally flat side for contacting the drive plate 204. The opposite side of the wobble carrier is substantially spherical in operational envelope for operating constrained by a spherical cavity 211 in the piston assembly. The wobble carrier assembly includes two split shoes 208 within the lateral bore in the wobble carrier. Each split shoe couples to a dual bearing T shape end coupling on each piston. The shoes 208 can move rotationally within the wobble carrier 202 and can move linearly along the bore axis as needed. The piston end cap (shoe) bearings allow tilting of the shoes along the bearing axis to maintain contact of the wobble carrier 202 assembly to the diagonal wobble drive 204. The piston T axis allows tilt in an orthogonal axis to the wobble carrier bore axis. Thus the two tilt axes allow for the wobble carrier to follow the changing tilt of the drive plate as the drive plate rotates around the drive axis. The pistons couple directly to two cylinders having valve structures 214 to accomplish pumping. As shown, the pumped fluid may then be delivered to a spray nozzle 110. Alternatively, the pump may deliver fluid, i.e., liquid or pressurized gas flow in an alternative pumping application. Alternatively, the valve structures 214 may be configured as a motor, operating the mechanism as a motor instead of a pump—receiving high pressure fluid and producing a rotation output.

Figure 4:
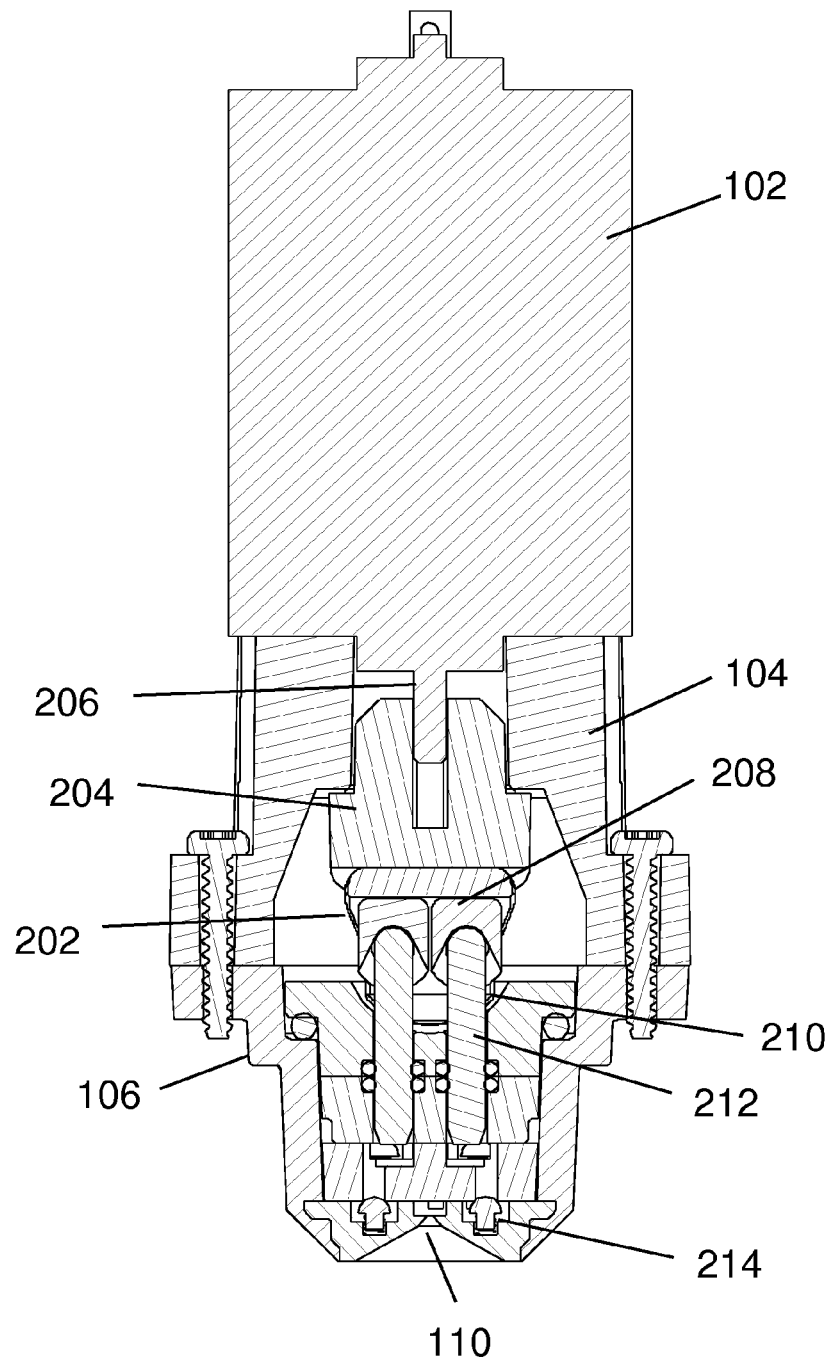
FIG. 4 is a cross section view as indicated for FIG. 3 in FIG. 2B, however the diagonal drive 204 is rotated 90 degrees showing the pistons 212 at half travel.

FIG. 4 is a cross section view as indicated for FIG. 3 in FIG. 2B, however the diagonal drive 204 is rotated 90 degrees showing the pistons 212 at half travel. Note that the wobble carrier 202 is level in this cross section view, although tilted in an orthogonal cross section (not shown). Note also the piston shoes 208 are level in this cross section view.

Figure 5:
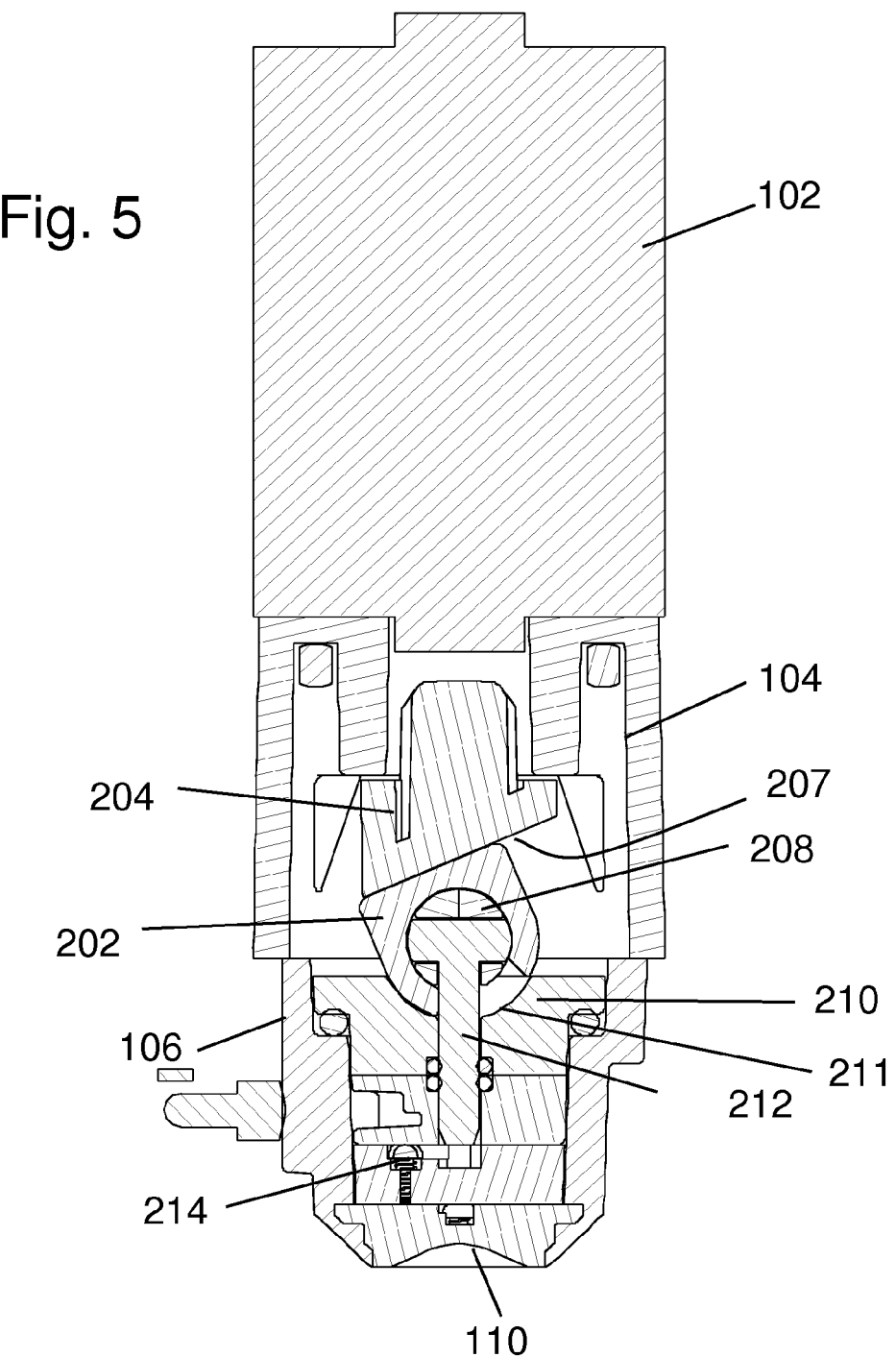
FIG. 5 is a cross section view of the exemplary sprayer as shown in FIG. 2B.

FIG. 5 is a cross section view of the exemplary sprayer as shown in FIG. 2B. The cross section passes through the center of one of the pistons 212. It can be appreciated that the motor shaft is not shown due to the location of the section plane. The wobble carrier 202 can be seen disposed between the diagonal drive surface 207 of the diagonal drive plate 204 and the spherical recess 211 in the top section 120 of the cylinder section 106. The spherical recess 211 provides a two axis spherical bearing allowing rotation of the wobble carrier 202 in response to the rotation of the diagonal drive 204.

The wobble carrier couples to the pistons through two half shoes that fit on the ends of the piston T section. The half shoes fit within a cylindrical bore in the wobble carrier and are free to move axially within the bore. The shoes are free to rotate around the axis of the cylindrical bore. The pistons have a T section. The lateral ends of the T section are cylindrical shafts that fit within the shoes forming a shaft and bearing. The T section bearings allow tilt of the shoes and wobble carrier orthogonal to the cylindrical bore axis, thus permitting two axis tilting of the wobble carrier.

Figure 6:
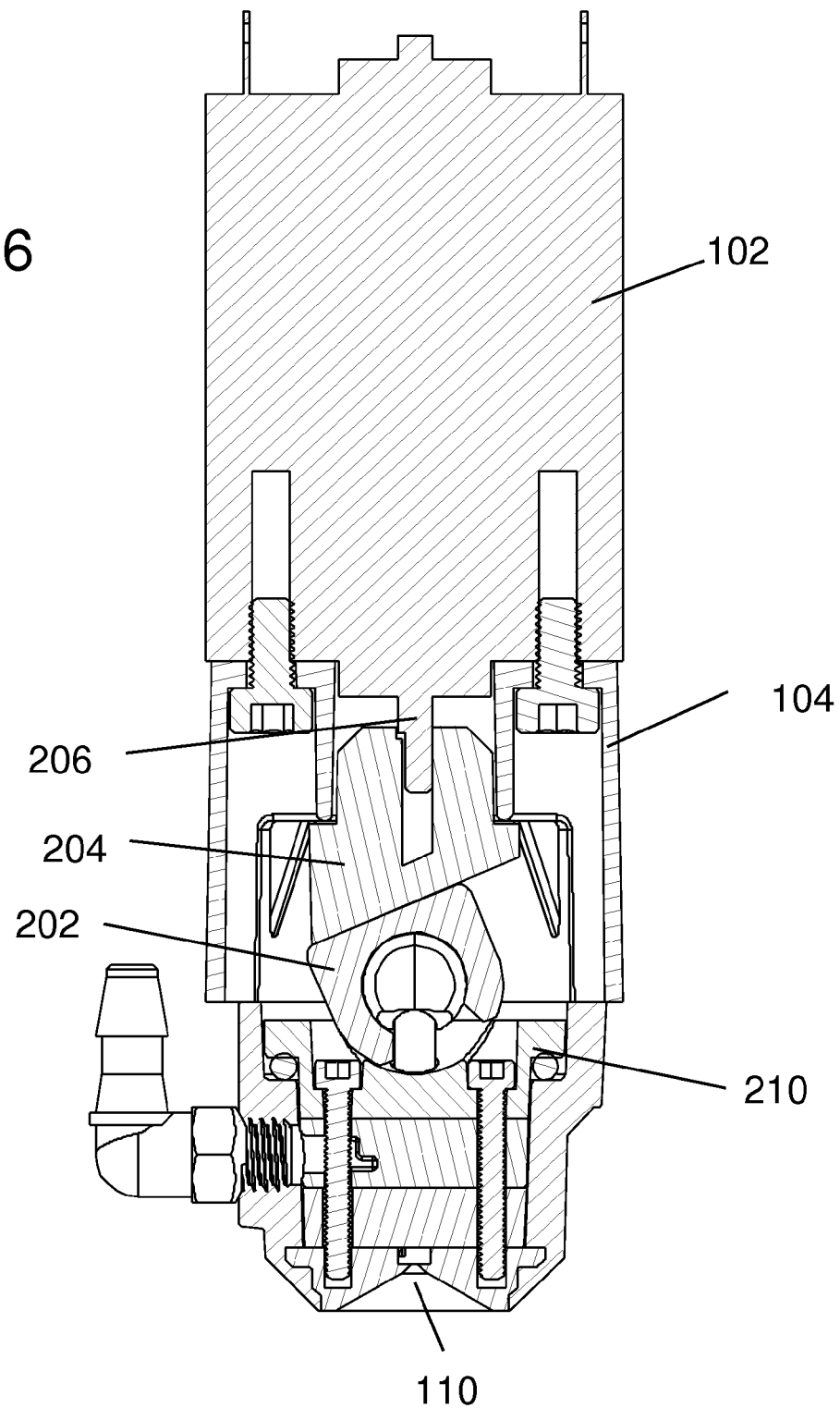
FIG. 6 shows a center cross section parallel to the cross section as indicated in FIG. 2B.

As the wobble drive rotates, the wobble carrier tilts, driving the pistons in and out of the piston cylinder in response to the tilting of the wobble carrier FIG. 6 shows a center cross section parallel to the cross section as indicated in FIG. 2B. FIG. 6 more clearly shows the motor shaft and assembly screws.

Figure 7:
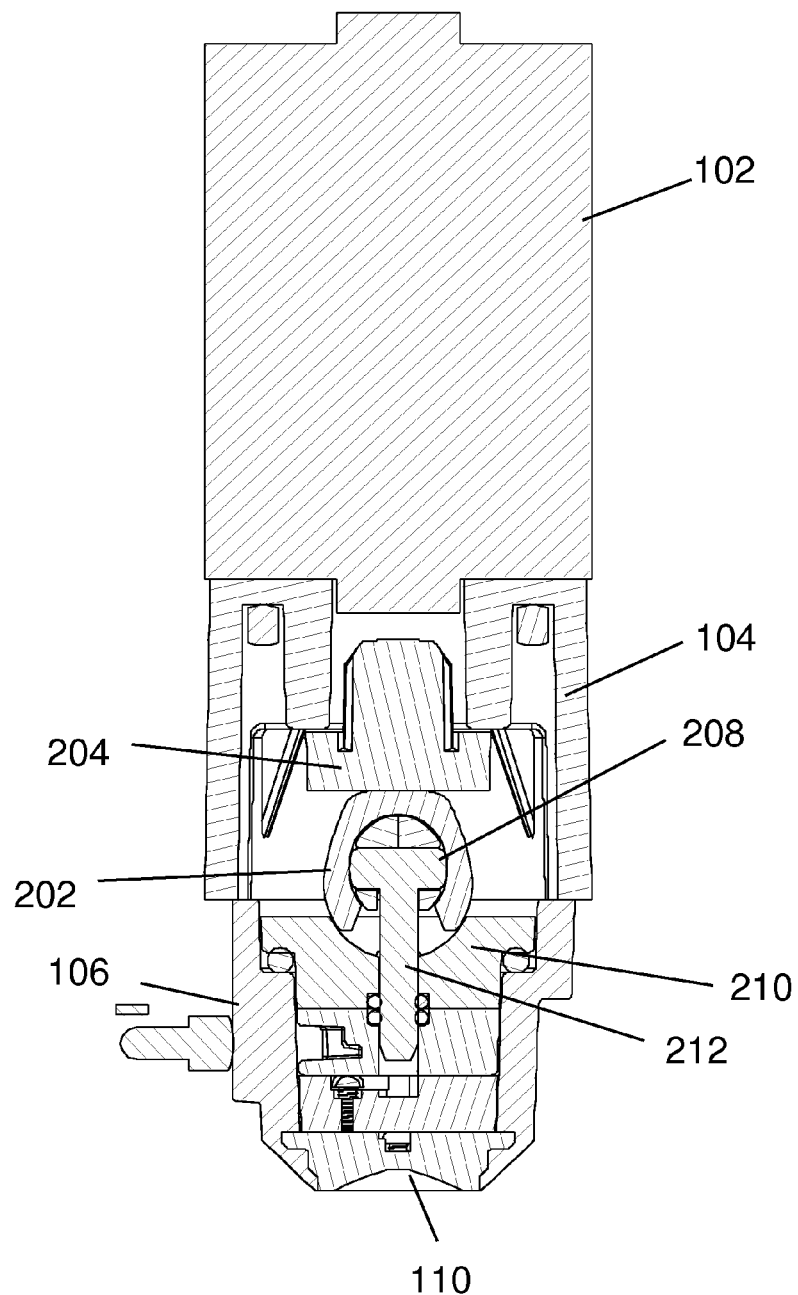
FIG. 7 is a cross section as indicated for FIG. 5 in FIG. 2B, but with the diagonal drive rotated 90 degrees.

FIG. 7 is a cross section as indicated for FIG. 5 in FIG. 2B, but with the diagonal drive rotated 90 degrees. The piston shown is at the top of the travel range.

Figure 8:
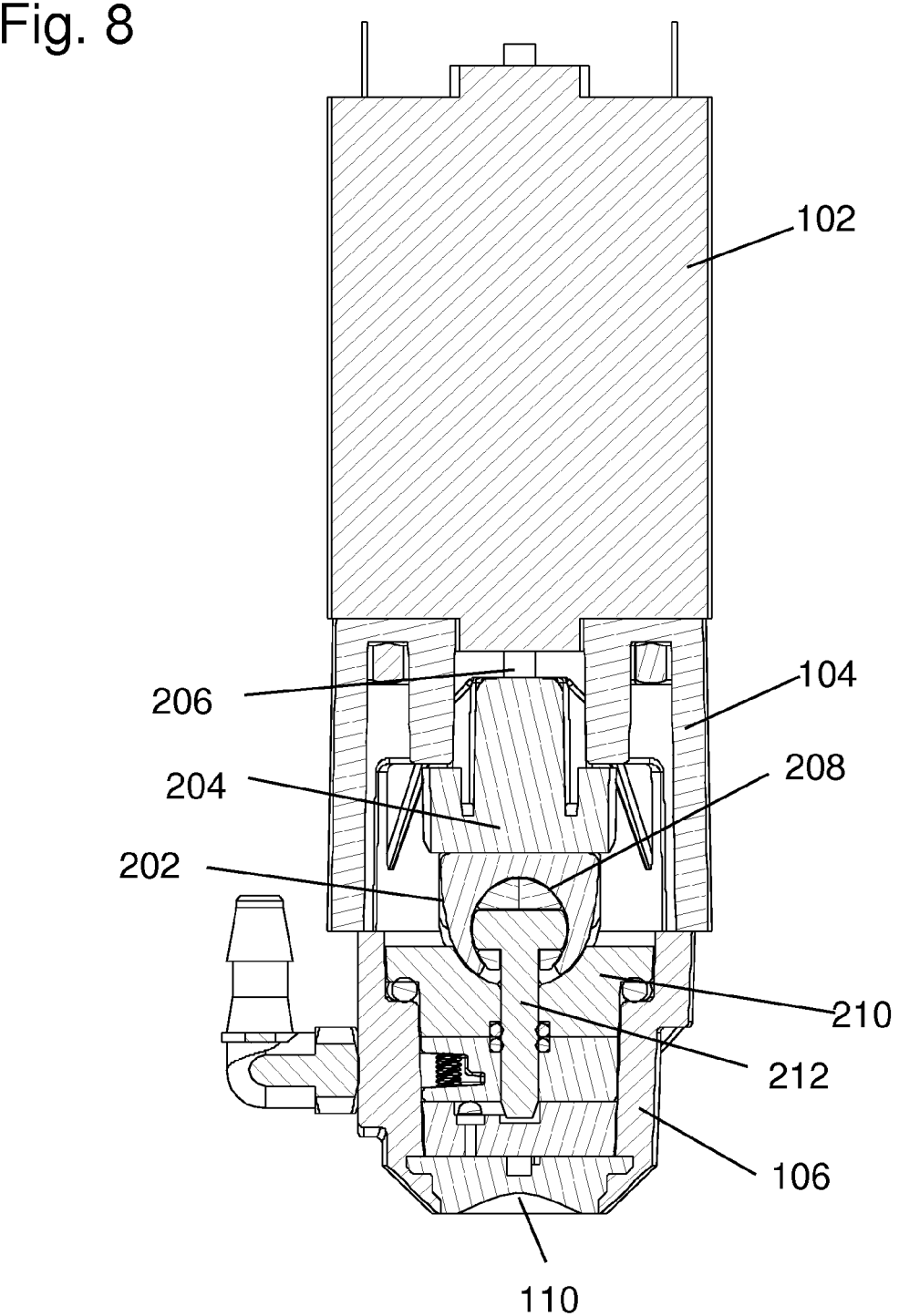
FIG. 8 is a cross section as indicated in FIG. 2B parallel to the cross section of FIG. 7, but showing the opposite piston.

FIG. 8 is a cross section as indicated in FIG. 2B parallel to the cross section of FIG. 7, but showing the opposite piston. The piston shown is at the bottom of the travel range.

Figure 9:
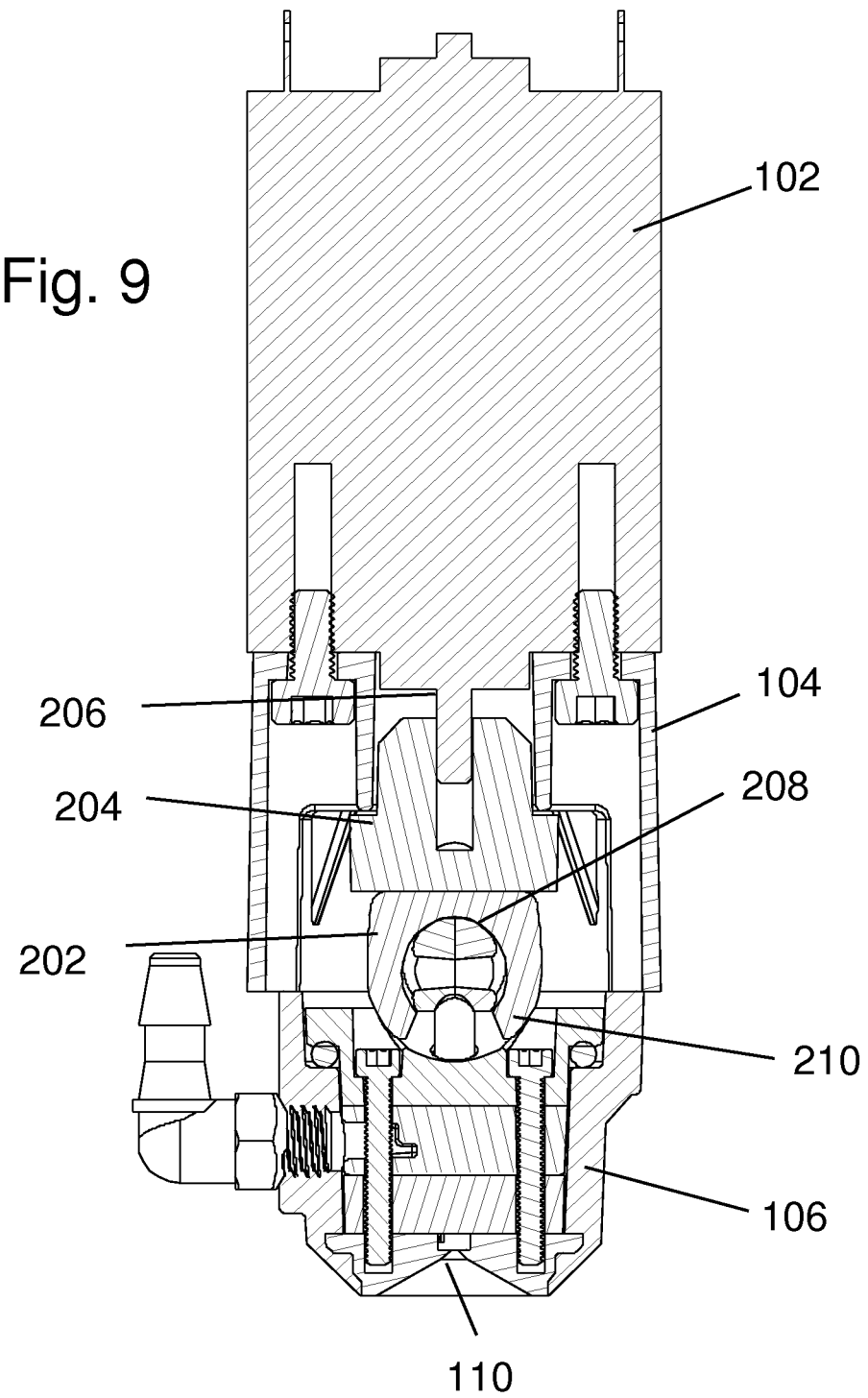
FIG. 9 is the same cross section as FIG. 6, but with the diagonal drive rotated 90 degrees.

FIG. 9 is the same cross section as FIG. 6, but with the diagonal drive rotated 90 degrees.

Figure 10A:
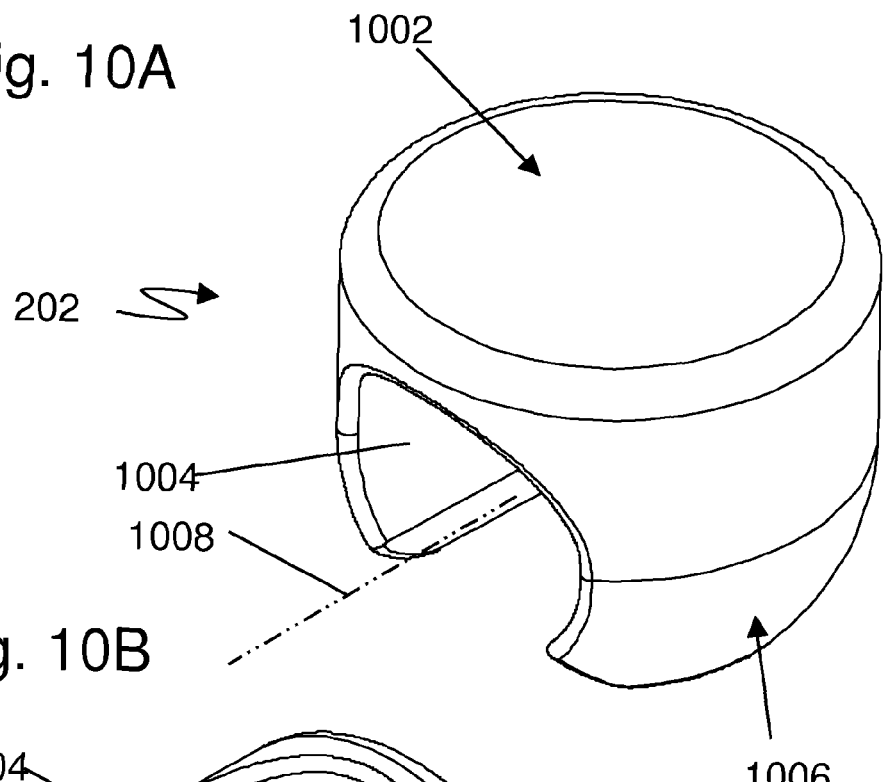
FIG. 10A and FIG. 10B show two isometric views of the wobble carrier.
Figure 10B:
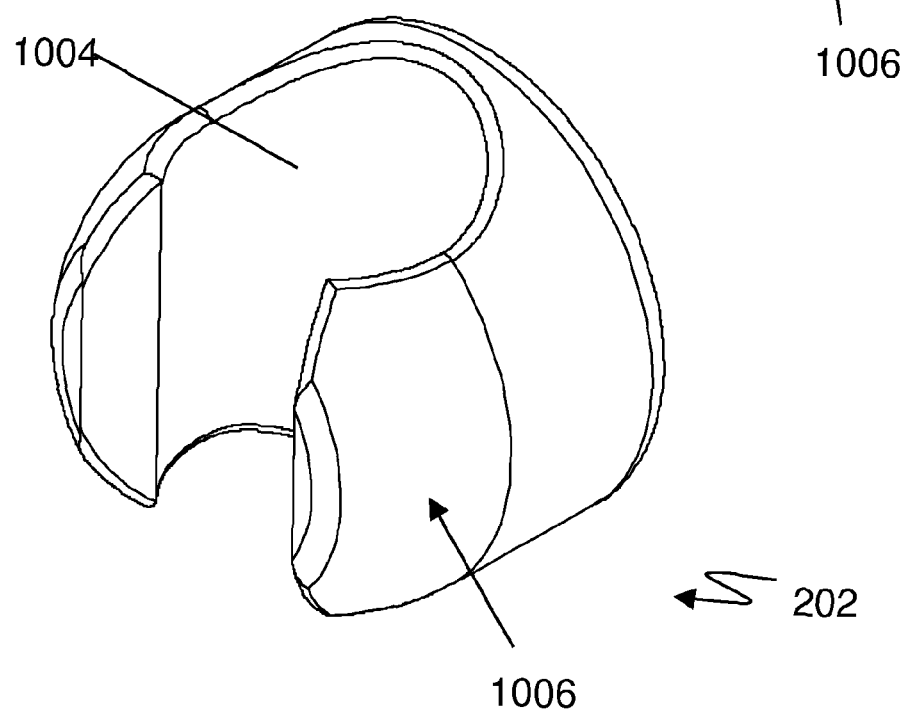
Figure 14:
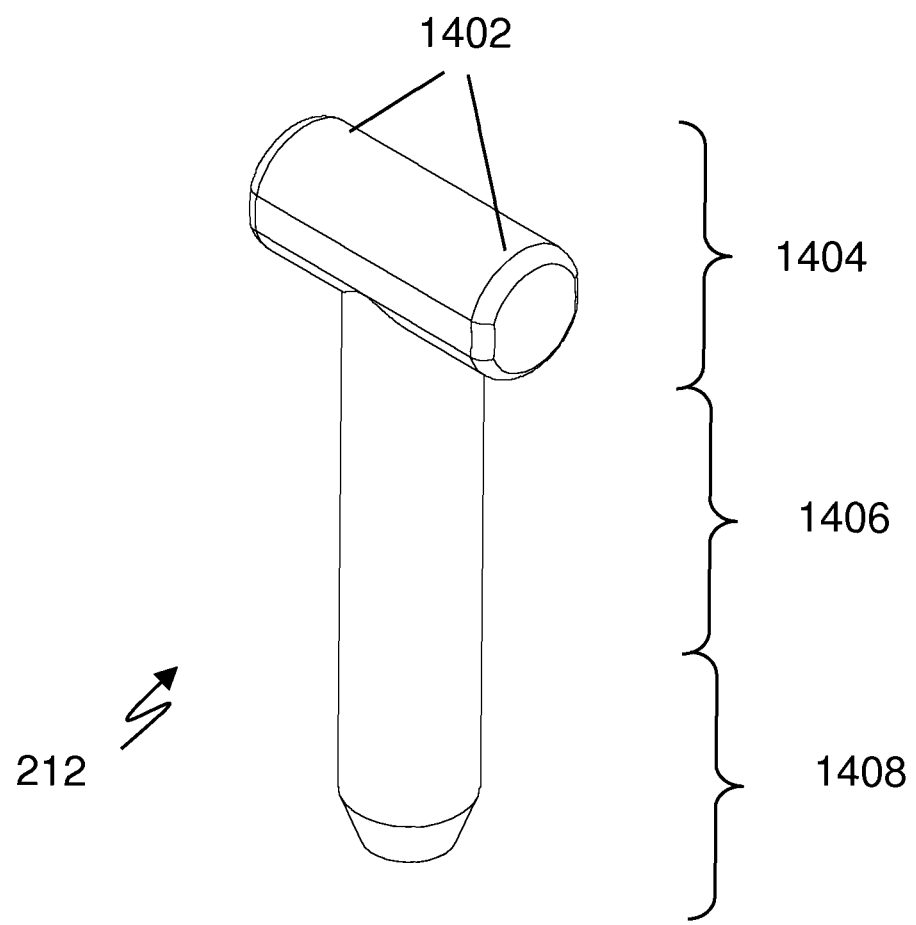
FIG. 14 shows an exemplary piston assembly.

FIG. 10A and FIG. 10B show two isometric views of the wobble carrier. Referring to FIG. 10A, the wobble carrier 202 has a flat side 1002 for contact with the diagonal drive plate 204 for receiving drive from the rotating diagonal drive plate 204. The wobble carrier 202 has a spherical surface 1006 opposite the flat surface 1002 for operational contact and support in the spherical recess 211 of the top cylinder section 210. The wobble carrier 202 also has a cylindrical bore 1004 having a bore axis 1008 preferably parallel to the flat surface 1002. The cylindrical bore 1004 carries the piston drive features, i.e., the piston shoes 2008 and piston T end shafts 1402 (FIG. 14).

Figure 11A:
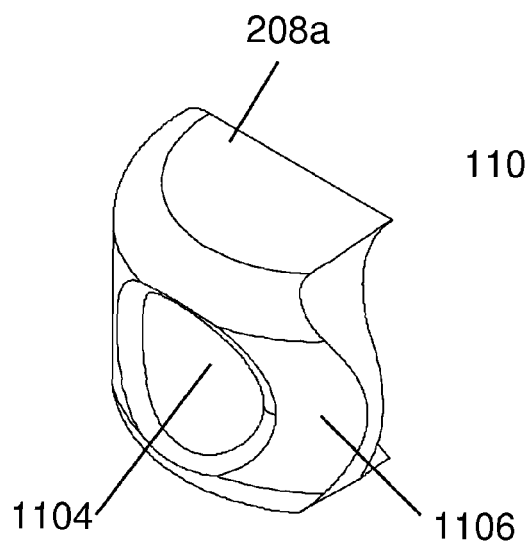
FIG. 11A and FIG. 11B show an isometric view of a left and right piston shoe bearing.
Figure 11B:
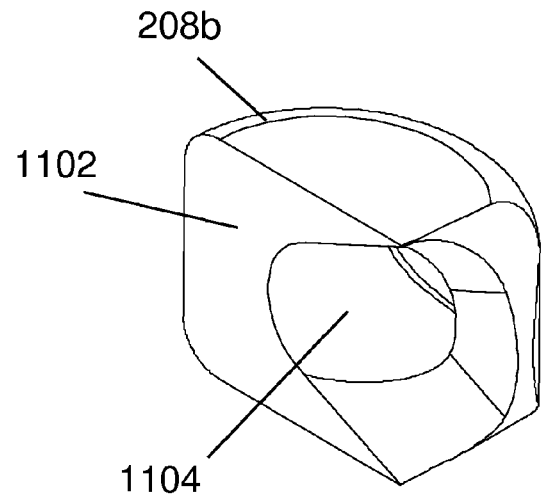

FIG. 11A and FIG. 11B show an isometric view of a left and right piston shoe bearing. The left and right half-shoes 208a and 208b fit over the ends of the piston T end shaft structure (1404 FIG. 14) to operate with each shaft 1402 of the T structure. (Half shoes 208a and 208b are each halves of the shoe 202.) Each half shoe 202a or 202b has a recess 1104 for allowing the shoe to pivot on the end of the T structure 1404. Each shoe has a partial cylindrical surface 202b for operating within the cylindrical bore 1008 of the wobble carrier 202. The two half shoes may be first assembled over respective ends of the T end 1404 of the piston structure so that the flat sides 1102 are face to face. The resulting assembly may be inserted into the wobble carrier 202. When two piston assemblies are assembled with the wobble carrier 202, the pistons 212 are inserted into the cylinders (see 1204 FIG. 12A) and the spherical surface 1006 of the wobble carrier 202 seats into the spherical recess 1202 FIG. 12A of the top cylinder section 210. The pieces fit together like the pieces of a puzzle, one piece holding another in place without the use of attachment screws, lock rings, spring clips or other attachments typically used to assemble motor parts.

Figure 11C:
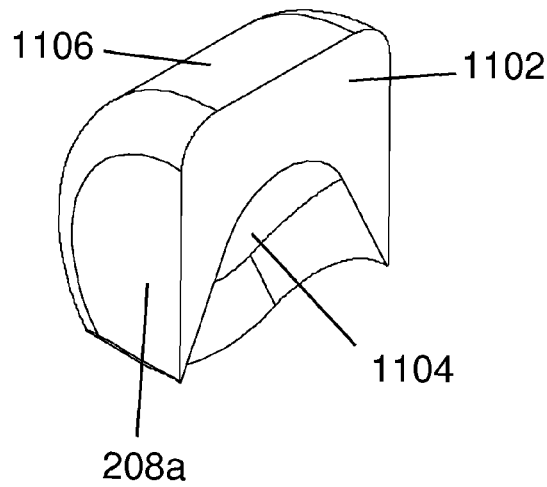
FIG. 11C and FIG. 11D illustrate a different isometric view of the piston shoe bearings of FIG. 11A and FIG. 11B.
Figure 11D:
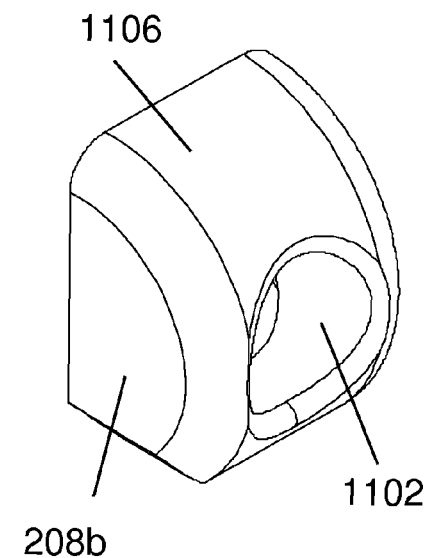

FIG. 11C and FIG. 11D illustrate a different isometric view of the piston shoe bearings of FIG. 11A and FIG. 11B.

Figure 12A:
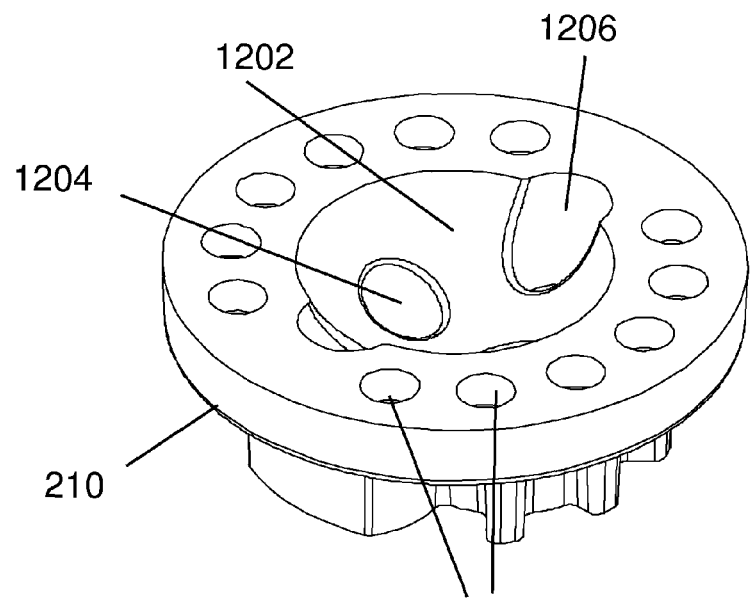
FIG. 12A and FIG. 12B illustrate an exemplary cylinder top section.
Figure 12B:
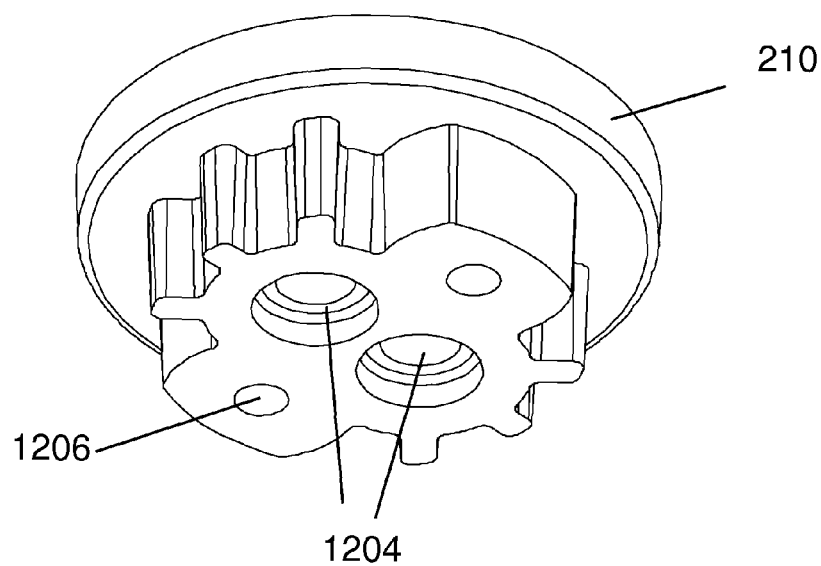

FIG. 12A and FIG. 12B illustrate an exemplary cylinder top section. FIG. 12A shows the spherical recess 1202 for receiving the spherical end 1006 of the wobble carrier 202. Also shown are piston drive holes 1204 and mounting screw holes 1206. Additional holes 1208 are provided for lightening the structure.

Figure 13A:
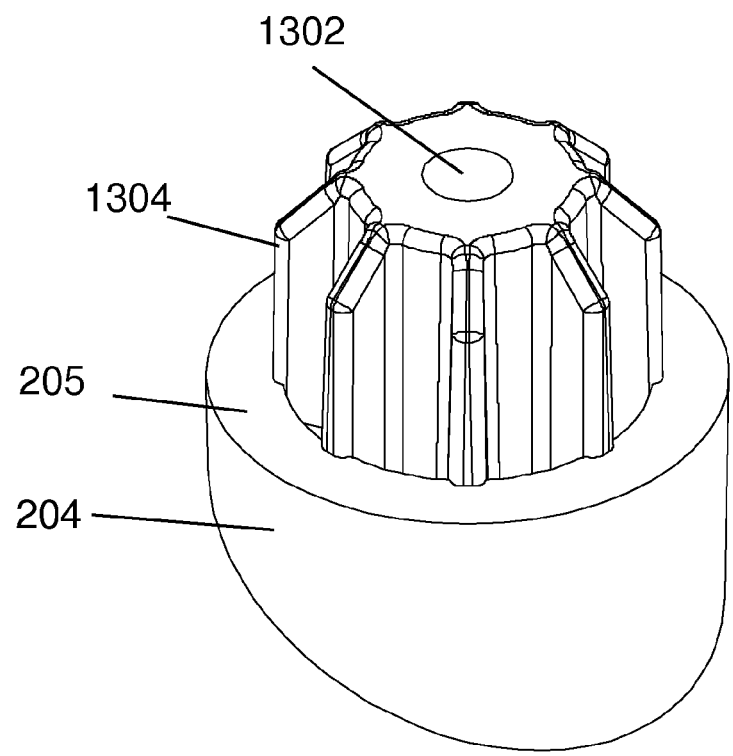
FIG. 13A and FIG. 13B show an exemplary diagonal drive plate.
Figure 13B:
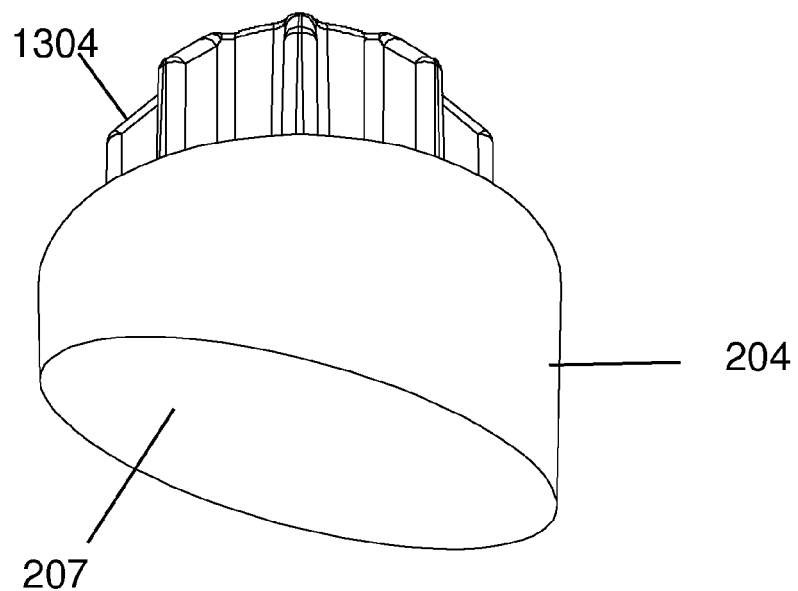

FIG. 13A and FIG. 13B show an exemplary diagonal drive plate. The diagonal drive plate 204 comprises a motor coupling structure 1302, which may be a D shape or a spline shape, square shape, or other shape allowing rotational drive coupling. In one embodiment, a set screw or other fastener may not be necessary. In other embodiments a set screw or other fastener may be used. Ribs 1304 are shown for lightening the structure. The outer surface of the ribs 1304 fit a cylindrical bore 203 in the housing and the step surface 205 is a thrust bearing operating with a corresponding surface on the housing. FIG. 13B shows the diagonal drive surface 207 for contacting and driving the wobble carrier 202.

FIG. 14 shows an exemplary piston assembly. The piston assembly 212 may be fabricated as a single part, but contains several functional areas. A piston portion 1408 at the bottom serves to pump the fluid and fit in a cylinder in the manner of a piston pump. A center section 1406 (alternatively referred to as a connecting rod) serves to connect the piston section to a drive coupling section 1404. The drive coupling section may be a T section 1404 as shown or other structure. The T section 1404 at the top serves to couple the piston to the shoes in the wobble carrier. Each side of the T is a cylindrical shaft 1402 for operating within the cylindrical bearing recess 1104 in each shoe 208. Alternatively, the T section may be a ball end or other rotational coupling to work with a corresponding complementary coupling in the shoe structure.

Figure 15:
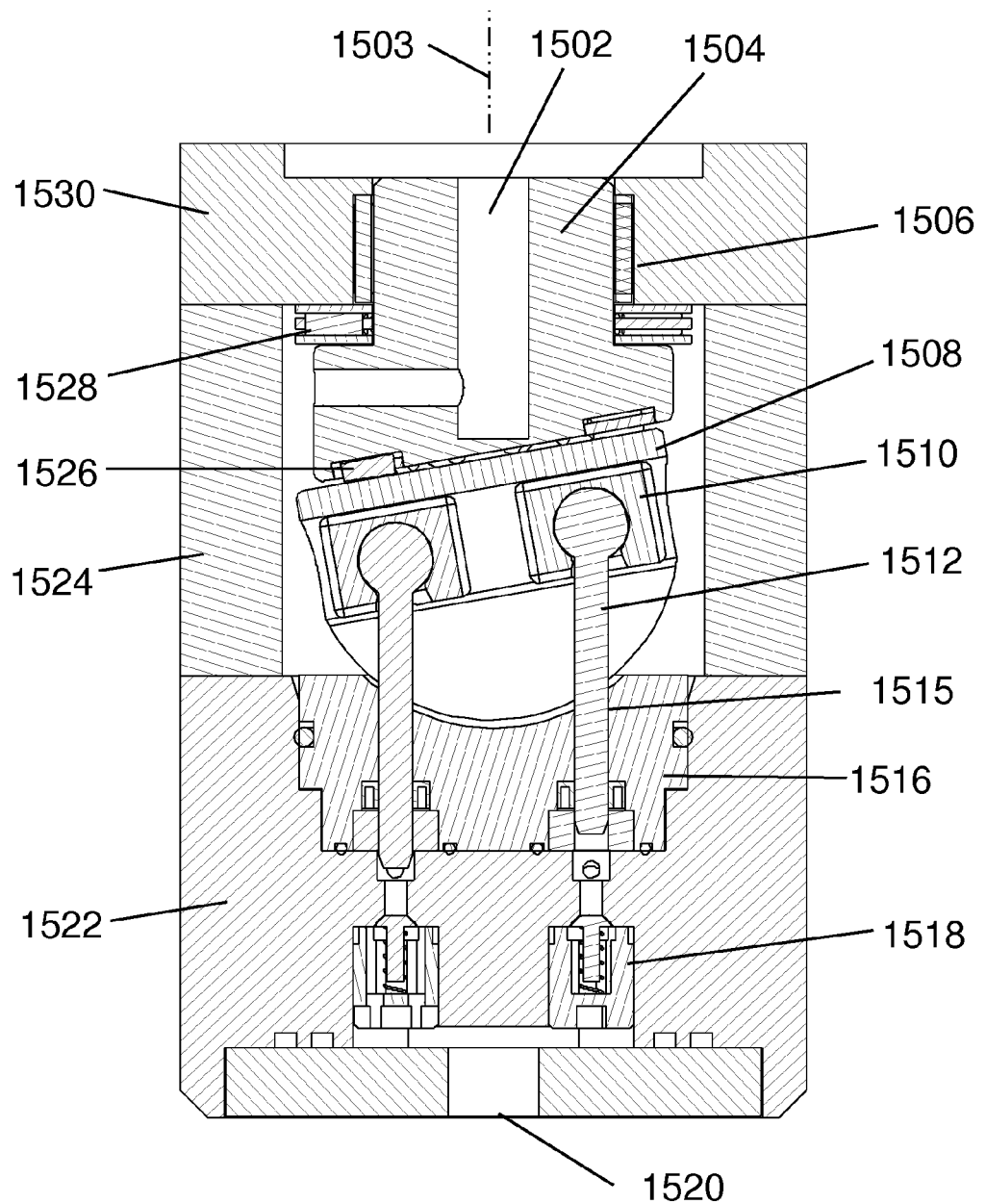
FIG. 15 illustrates a second exemplary embodiment in accordance with the present invention.

FIG. 15 illustrates a second exemplary embodiment in accordance with the present invention. FIG. 15 illustrates the use of a ball end bearing on the piston coupling to the shoes. FIG. 15 also illustrates the use of ball bearings or low friction pads on sliding surfaces.

Referring to FIG. 15, a motor is coupled to the diagonal drive plate 1502 using a coupling structure 1502. An option for a set screw is shown. A bearing 1506 may be used between the top housing 1530 and the hub of the diagonal drive plate 1504. The diagonal drive plate may also operate with a thrust bearing 1528. The diagonal drive plate 1504 is coupled to the wobble carrier 1508 using a bearing 1526. The bearing 1526 is optional and, if used, may be a ball bearing or an anti-friction pad. The bearing 1526 may be in the diagonal drive plate 1504 as shown or may be in the wobble carrier 1508. The wobble carrier carries piston cap shoes (also referred to as piston shoes, reciprocating drive shoes, or shoes) 1510 that drive coupling rods 1512 that may include the pistons as shown. The wobble carrier operates in a spherical recess in the cylinder top section 1516. Valve structures 1518 are shown leading to the output port 1520. A bottom section 1522 houses the cylinder and valve components. A mid housing section 1524 is provided for ease in assembly.

Figure 16:
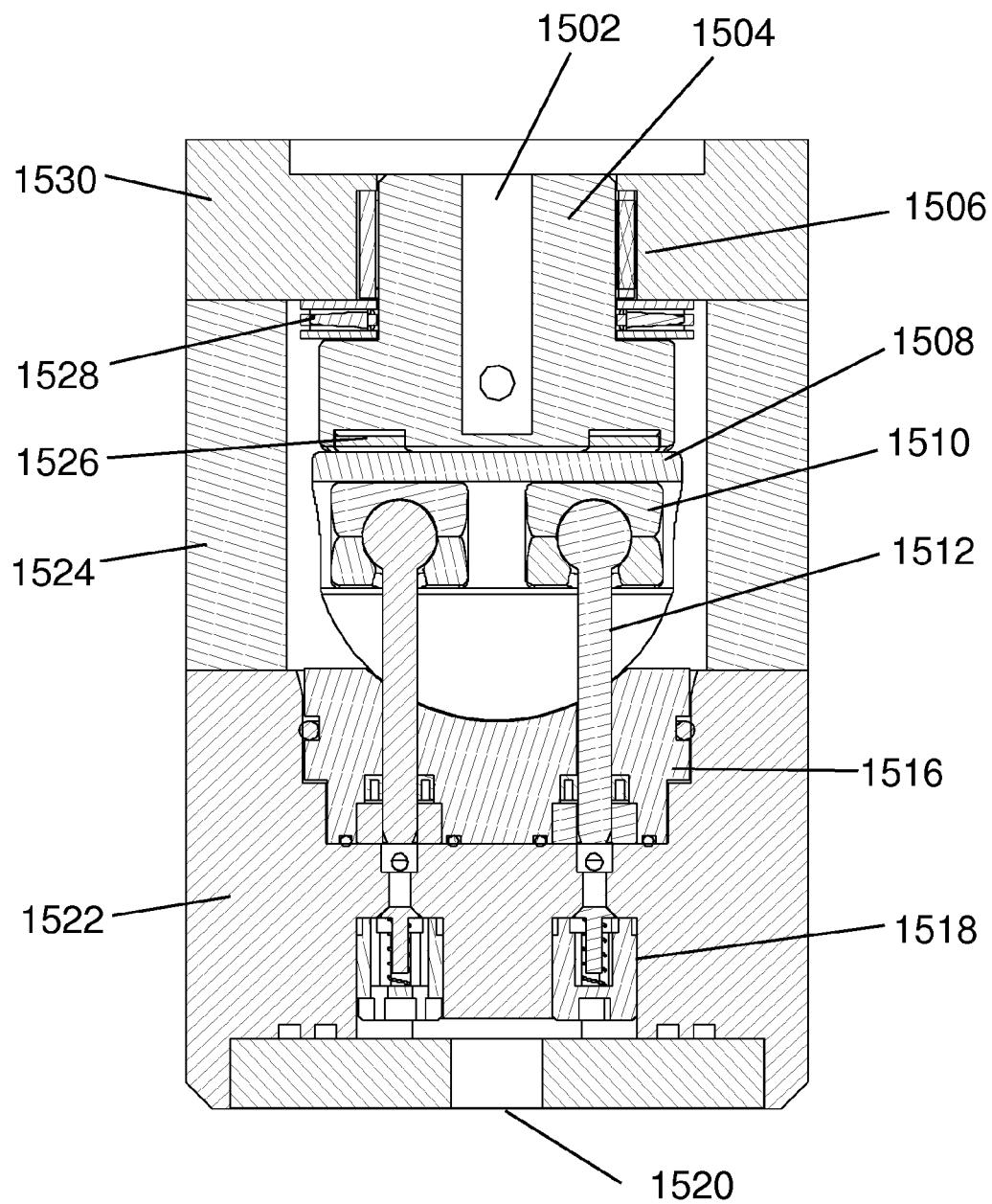
FIG. 16 illustrates the system of FIG. 15 with the diagonal drive plate rotated.

FIG. 16 illustrates the system of FIG. 15 with the diagonal drive plate rotated.

Figure 17:
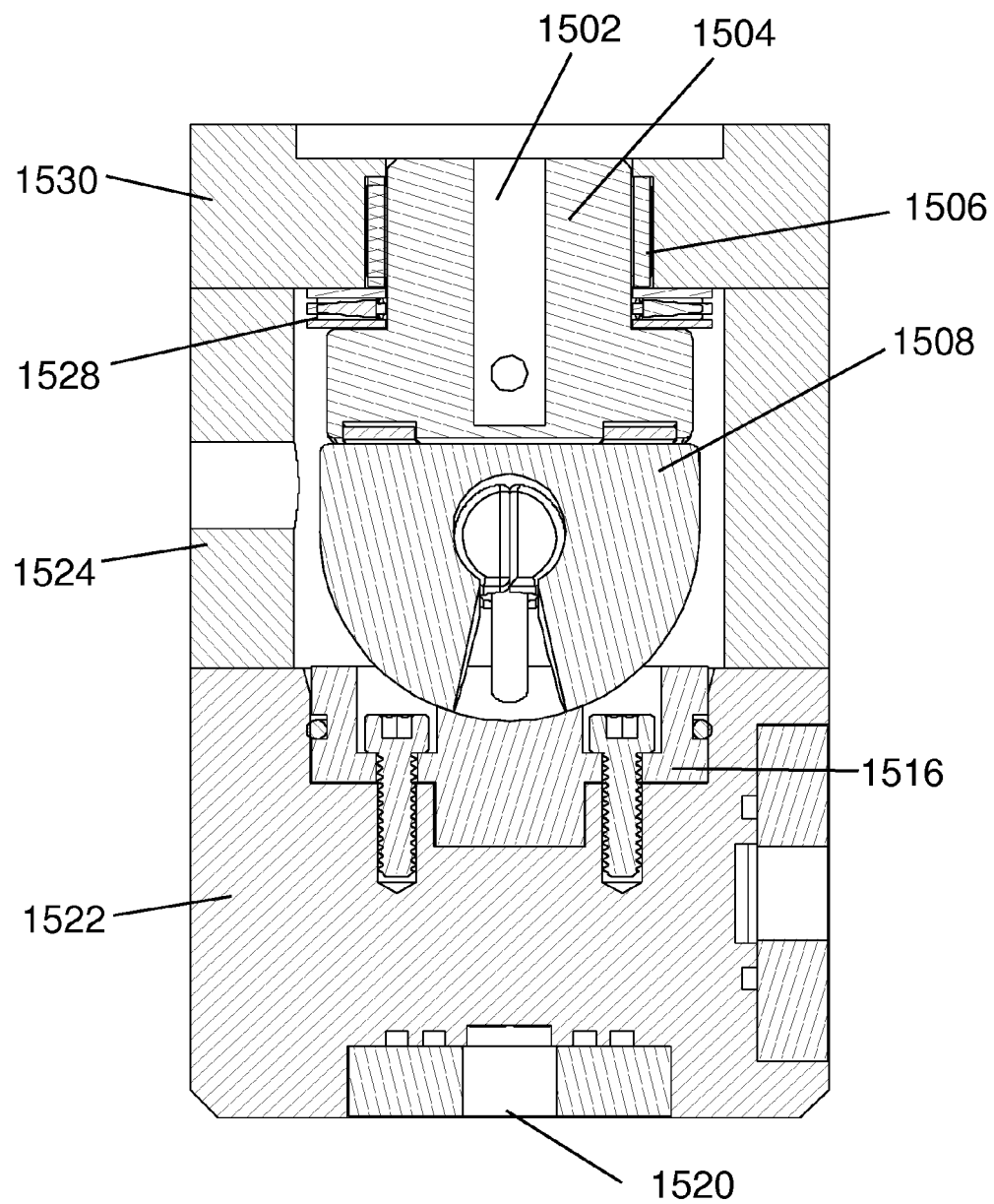
FIG. 17 illustrates the system of FIG. 15 at a center section.

FIG. 17 illustrates the system of FIG. 15 at a center section.

Figure 18:
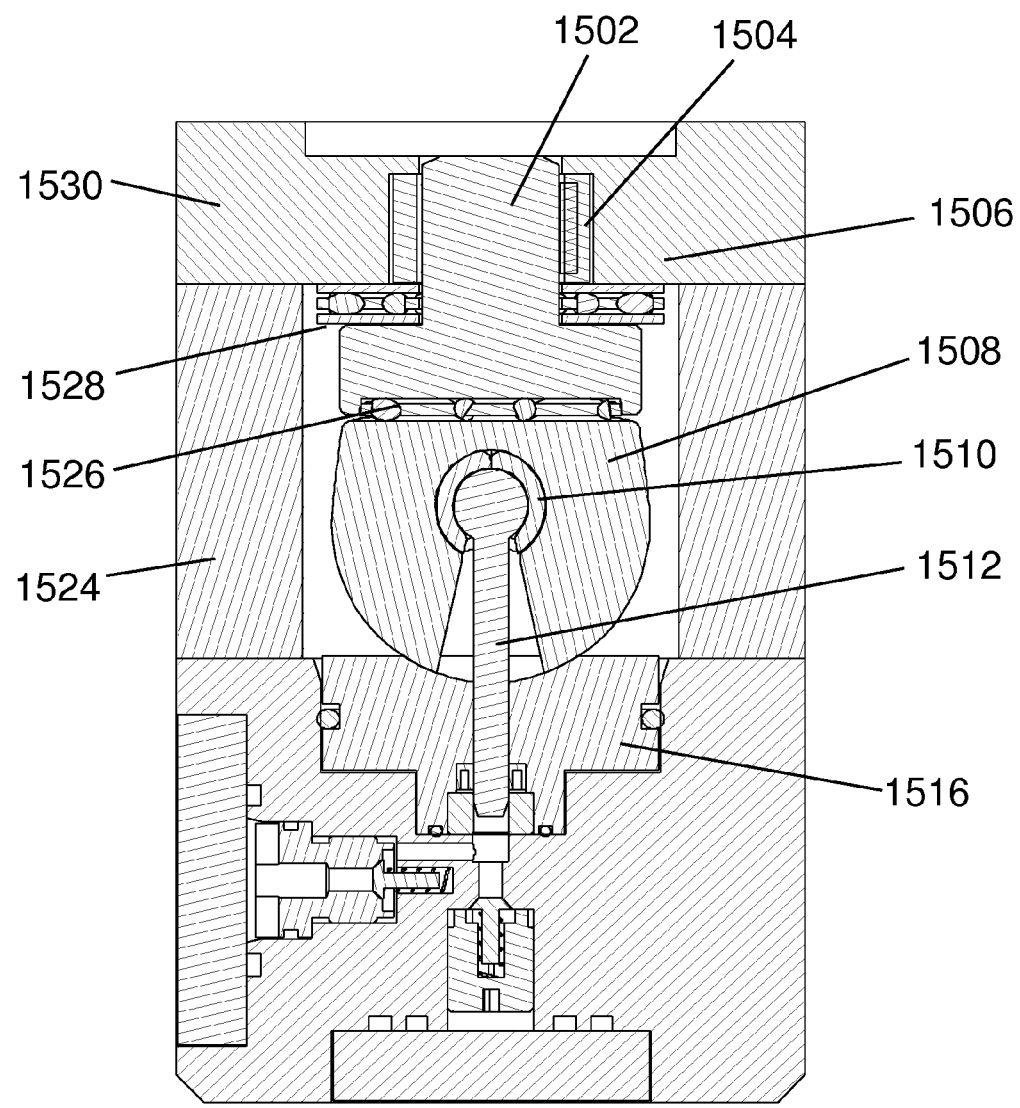
FIG. 18 shows the system of FIG. 15 at a section through one piston with the piston at maximum upward position.

FIG. 18 shows the system of FIG. 15 at a section through one piston with the piston at maximum upward position.

Figure 19:
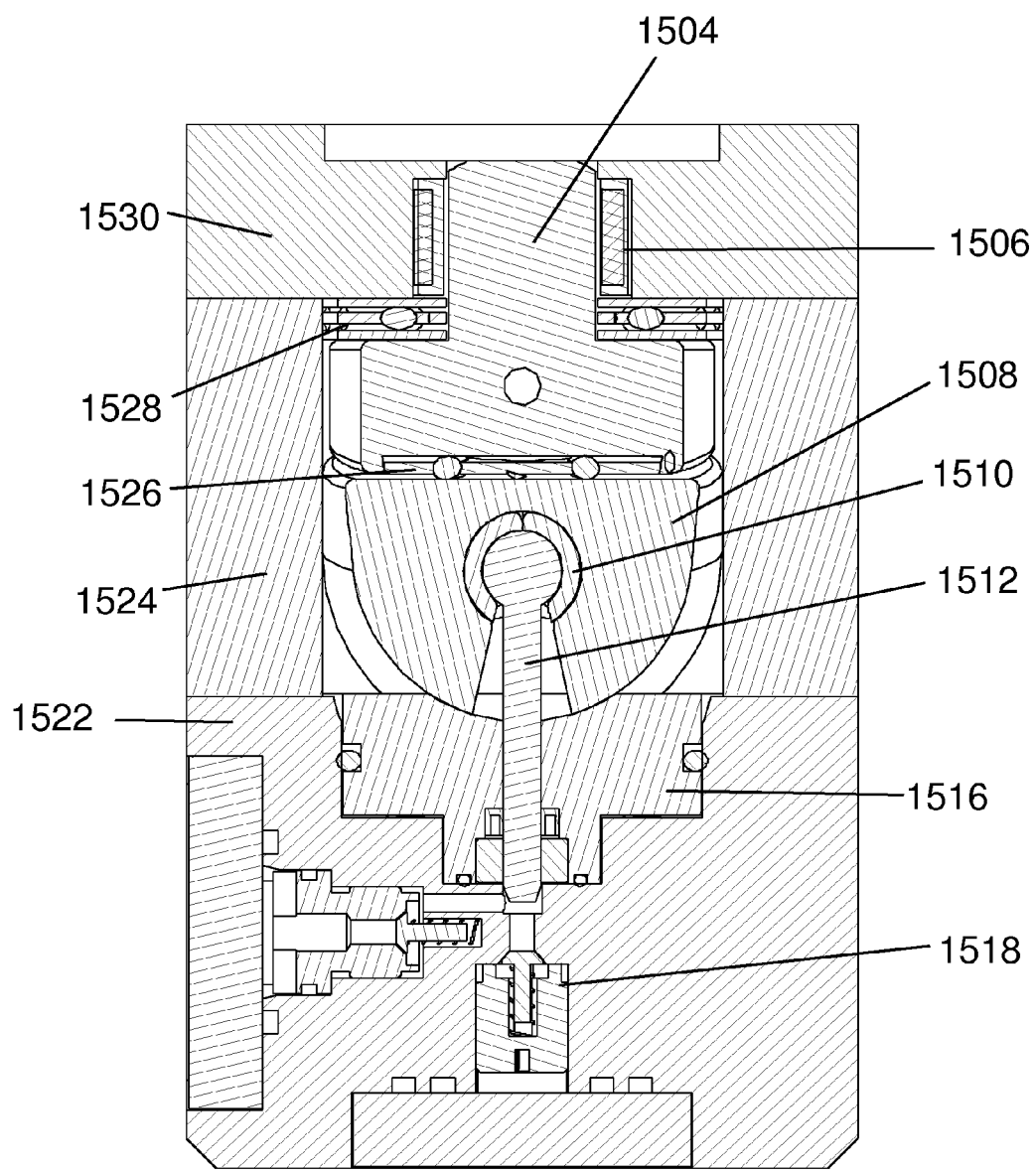
FIG. 19 shows the system of FIG. 18 with the diagonal drive rotated to show the piston at maximum downward travel.

FIG. 19 shows the system of FIG. 18 with the diagonal drive rotated to show the piston at maximum downward travel.

Figure 20:
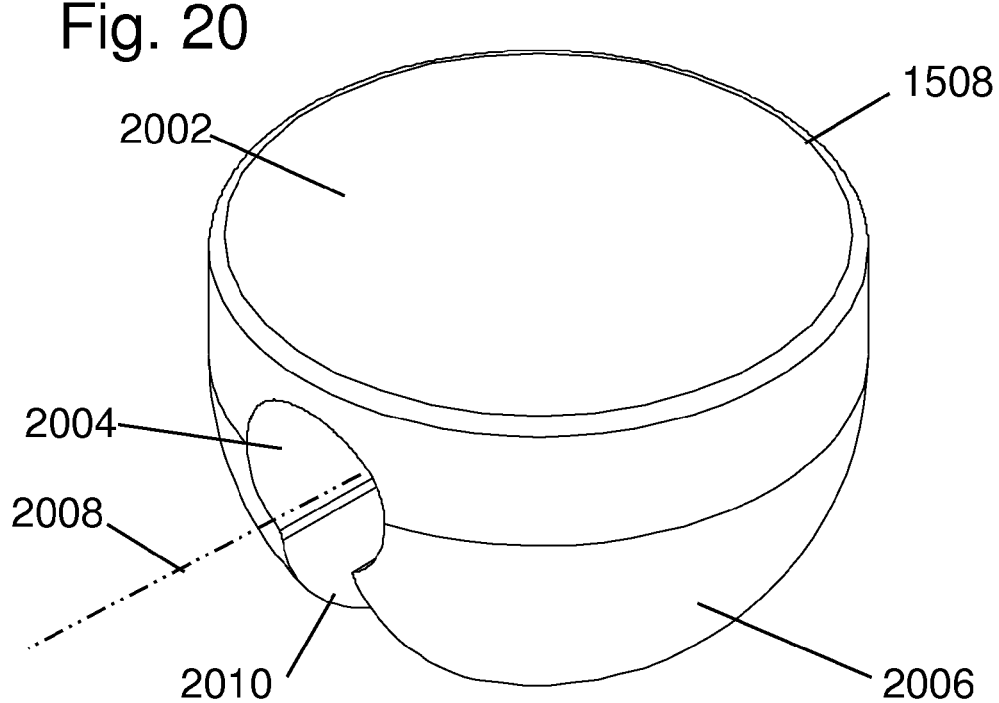
FIG. 20 shows the wobble carrier of the system of FIG. 15.

FIG. 20 shows the wobble carrier of the system of FIG. 15. The wobble carrier 1508 has a flat surface 2002 and a spherical surface 2006. The wobble carrier may have a cylindrical bore 2004 with an axis 2008. The bore 2004 may alternatively be referred to as a slot, track, or channel. The bore axis is preferably parallel to a plane of the flat surface 2002. The bore, as shown has a cylindrical shape (circular cross section) with an opening 2010 in one side to allow for the piston connecting rod. The opening extends through the spherical surface to allow for the connecting rod during operation and extends to the side of the wobble carrier at the end of the bore to allow for insertion of a subassembly comprising the reciprocating drive shoe components with the rod end coupling and connecting rod, during assembly of the device.

As shown, the opening 2010 extends along the full length of the bore in the wobble carrier (see for example FIG. 15); however, depending on the wobble angle and the space for the connecting rod, the opening 2010 may be filled at the center bottom of the wobble carrier. Including material at the bottom center, between the two connecting rods, to connect the two sides of the wobble carrier 1508 may improve the strength of the part.

Alternatively, (not shown) the bore 2004 may have a rectangular cross section or other shape to work with a shoe having a corresponding shape for sliding in the bore.

The wobble motion of the wobble carrier has two orthogonal components of tilt rotation that need to be accommodated. The cylindrical shoe operating in a cylindrical bore may accommodate one axis of rotation, i.e., rotation about the bore axis 2008. The other tilt axis, perpendicular to the bore axis 2008 may be accommodated by the spherical piston rod end bearing or the T bearing with a corresponding shoe socket to fit the piston end bearing. In an alternative variation, if the spherical piston end bearing is used, the bore may have a rectangular or other cross section because the piston shoe does not need to accommodate the tilt around the bore axis 2008. The tilt in both directions may be accommodated by the piston spherical end.

In one variation, the center of a sphere defining the spherical surface 2006 may be located on the axis 2008. This location may be preferred, but is not critical. The location may preferably be at or below the flat surface of the wobble carrier, and more preferably within the radius of the bore from the centerline of the bore. For center of sphere locations higher or lower than on the centerline of the bore, the reciprocating action may function, but the lateral motion of the piston shoes in the bore may be increased, thereby increasing friction losses.

The radius of the sphere as shown is sufficient to include the full length of the drive shoe at the full extent of travel in the bore; however, other radius values may be selected. Preferably the radius is sufficient that the spherical bearing operates below the drive shoe, i.e., the bore is between the flat surface and the operative surface of the spherical bearing. The radius of the sphere may be sufficient that a part of the spherical surface is altered to allow passing of the connecting rod through the spherical surface defining the spherical bearing, and possibly through the spherical bearing seat as well (see FIG. 22).

Figure 21:
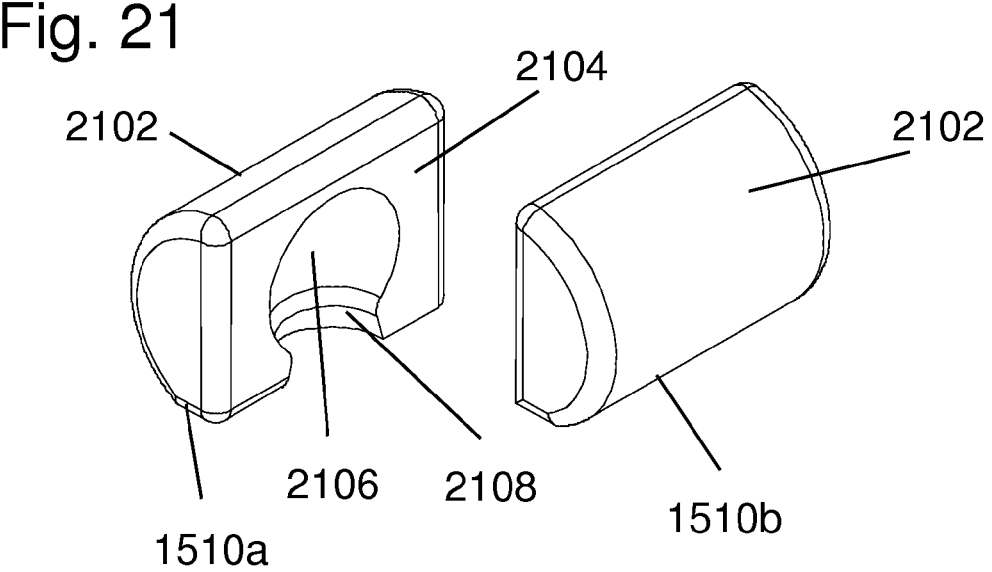
FIG. 21 shows the piston shoes for the wobble carrier of FIG. 15.

FIG. 21 shows the piston shoes for the wobble carrier of FIG. 15. The piston half shoes 1510*a* and 1510*b* together form a piston shoe 1510. The half shoes have a cylindrical surface 2102 and a flat surface 2104. The half shoes have a recess 2106 for receiving the connecting rod end 2402 and an opening 2108 for the connecting rod 2406. The piston shoe may also be referred to as a reciprocating drive shoe 1510.

The piston shoe of FIG. 21 is partitioned into two parts as an exemplary partitioning that allows assembly of the piston spherical end into the shoe during assembly and capturing the spherical rod end when assembled into the wobble carrier. Alternatively (not shown), the partition plane may be horizontal rather than vertical as shown. The resulting top portion would include a hemispherical bearing. The bottom portion would include the annular spherical bearing with an aperture for the piston connecting rod portion. For further alternative partitioning, see, for example, the end-cap partitioning of the piston shoe in FIGS. 25-30.

The piston shoe is partitioned into two or more components, preferably into only two components. The two or more components collectively include a top bearing portion proximal to the wobble hub for coupling axial compression motion to the pistons (extension motion of the reciprocating motion), also a bottom bearing portion for retracting the pistons and an aperture for passing therethrough a piston connecting rod portion.

When assembled, the piston shoe captures the piston end coupling to transfer bi-directional axial motion to the pistons while allowing bi-axial tilting motion of the wobble carrier around axes orthogonal to the piston axis.

As shown the two or more components of the reciprocating drive shoe are held in place for operation by the walls of the wobble carrier bore and the coupling rod end coupling. The walls of the wobble carrier bore prevent the separation of the components and the coupling rod end coupling prevents relative sliding of the reciprocating drive shoe components. Thus the components of the reciprocating drive shoe may be held in place without fasteners, welding, or glue.

Figure 22:
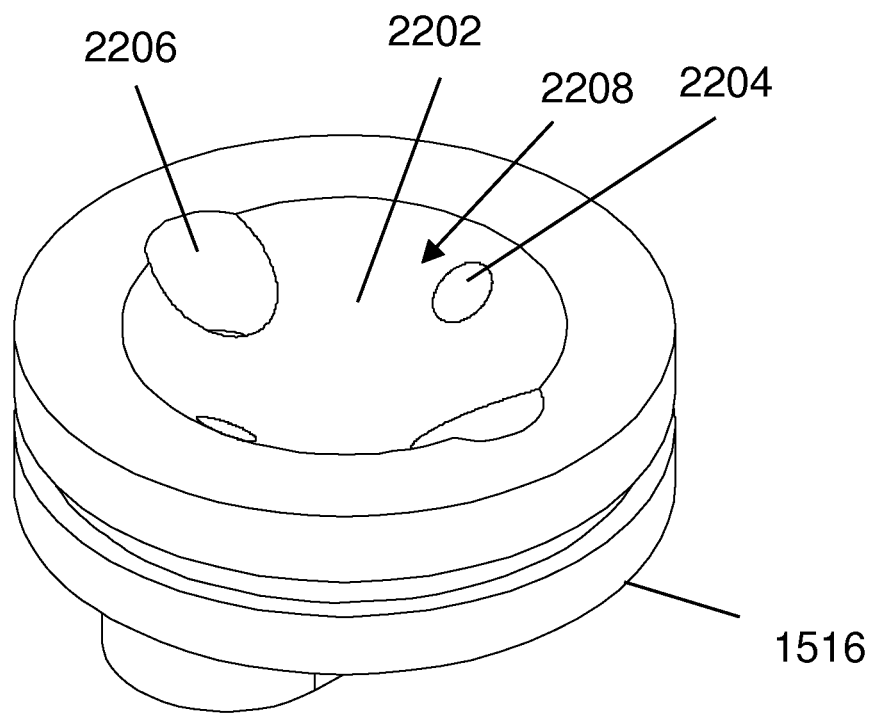
FIG. 22 shows the top cylinder section for the system of FIG. 15.

FIG. 22 shows the top cylinder section for the system of FIG. 15. The top section 1516 comprises the spherical recess 2202 for receiving the wobble carrier 1508. Piston cylinder holes 2204 are shown and mounting screw holes 2206 are shown.

The spherical recess forms a spherical bearing seat 2208 for the spherical surface of the wobble carrier. The spherical recess 2202 may have sufficient lateral width or extent to ensure capturing the wobble carrier between the diagonal drive plate and the top section for all rotation angles of the diagonal drive plate. Thus the spherical recess 2202 may contain at least an angular section of the sphere equal to the diagonal angle of the diagonal drive plate, and preferably greater. For example, if the diagonal drive plate 1504 has a diagonal angle of 20 degrees, then the spherical recess 2202 may extend from the center at least 20 degrees. To positively capture the wobble carrier, an additional amount, for example, three degrees to fifteen degrees may be added to ensure the wobble carrier 1508 cannot 'pop' out of the bearing 2208 under pumping stresses and part tolerances. The angular section of the sphere defining the recess 2202 may also be specified as the depth at the center or the radius or diameter of the circle at the maximum lateral extent of the recess 2202.

Figure 24:
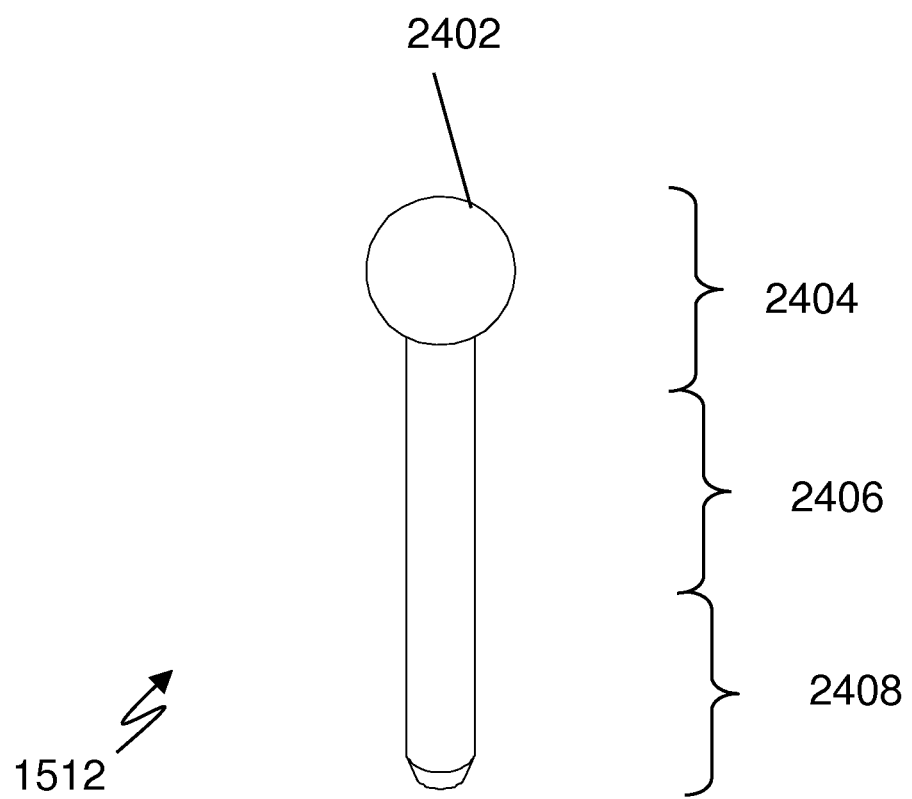
FIG. 24 shows the piston of the system of FIG. 15.

The piston cylinder holes 2204 are shown which hold the connecting rods 2406 leading to the pistons 2408 (see FIG. 24). The side walls of the piston cylinder hole 2204 provide lateral restraint for the connecting rod 2406 to prevent the wobble carrier 1508 from rotating around the drive axis 1503 as a result of friction between the wobble carrier 1508 and diagonal drive plate 1504. The piston cylinder holes 2204, as illustrated, pass through the spherical surface 2208 of the spherical recess 2204, thus permitting a greater radius and a greater lateral extent of the spherical bearing seat 2208 than would otherwise by available. The side walls of the cylinder holes 2204 provide lateral restraint for the pistons 2408 and connecting rods 2406 (assembly 1512). The lateral restraint is communicated through the connecting rods 2406 to the wobble carrier 1508, preventing rotation of the wobble carrier 1508 around the input drive axis 1503.

Figure 23:
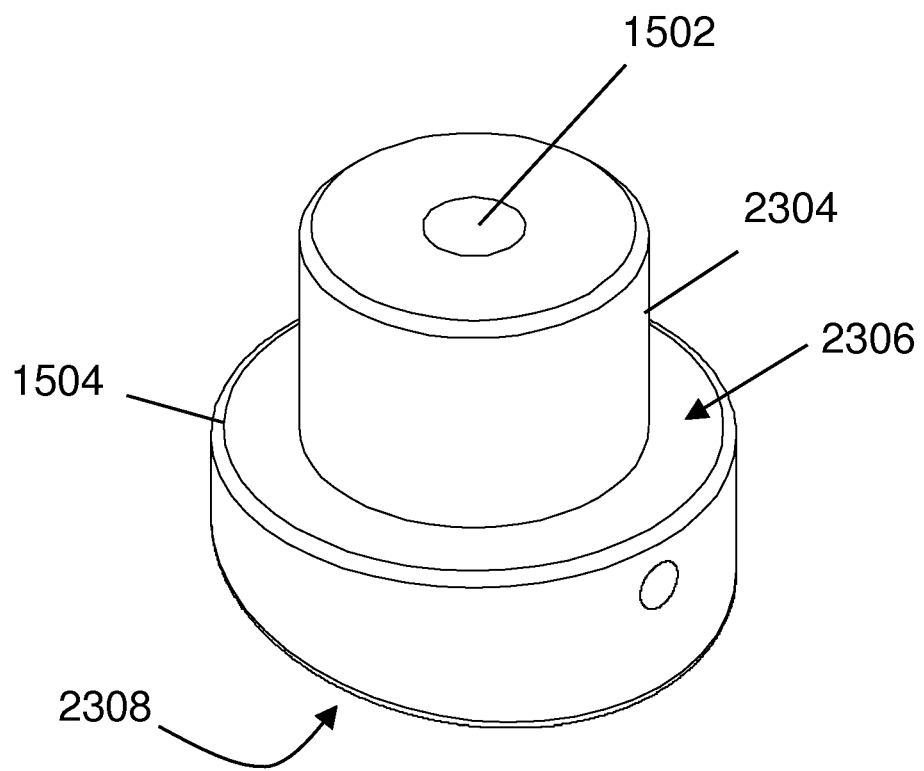
FIG. 23 shows the diagonal drive plate of the system of FIG. 15.

FIG. 23 shows the diagonal drive plate 1504 of the system of FIG. 15. The diagonal drive plate 1504 comprises a drive structure 1502 a drive hub 2304, a thrust bearing surface 2306. The diagonal drive surface 2308 is hidden from view, but is evident in the profile. The angle of the diagonal drive surface 2308 from the drive axis may be, for example 20 degrees. Other angles may be used, for example from slightly more than zero degrees to forty five degrees.

FIG. 24 shows the piston of the system of FIG. 15. The piston assembly 1512 may be fabricated as a single part, but contains several functional areas. A piston portion 2408 at the bottom serves to pump the fluid and fit in a cylinder in the manner of a piston pump. A center section 2406 (alternatively referred to as a connecting rod) serves to connect the piston section to a drive coupling section 2404. The drive coupling section may be a ball end 2402 as shown or other structure, for example the T structure 1402 of FIG. 14.

Figure 25:
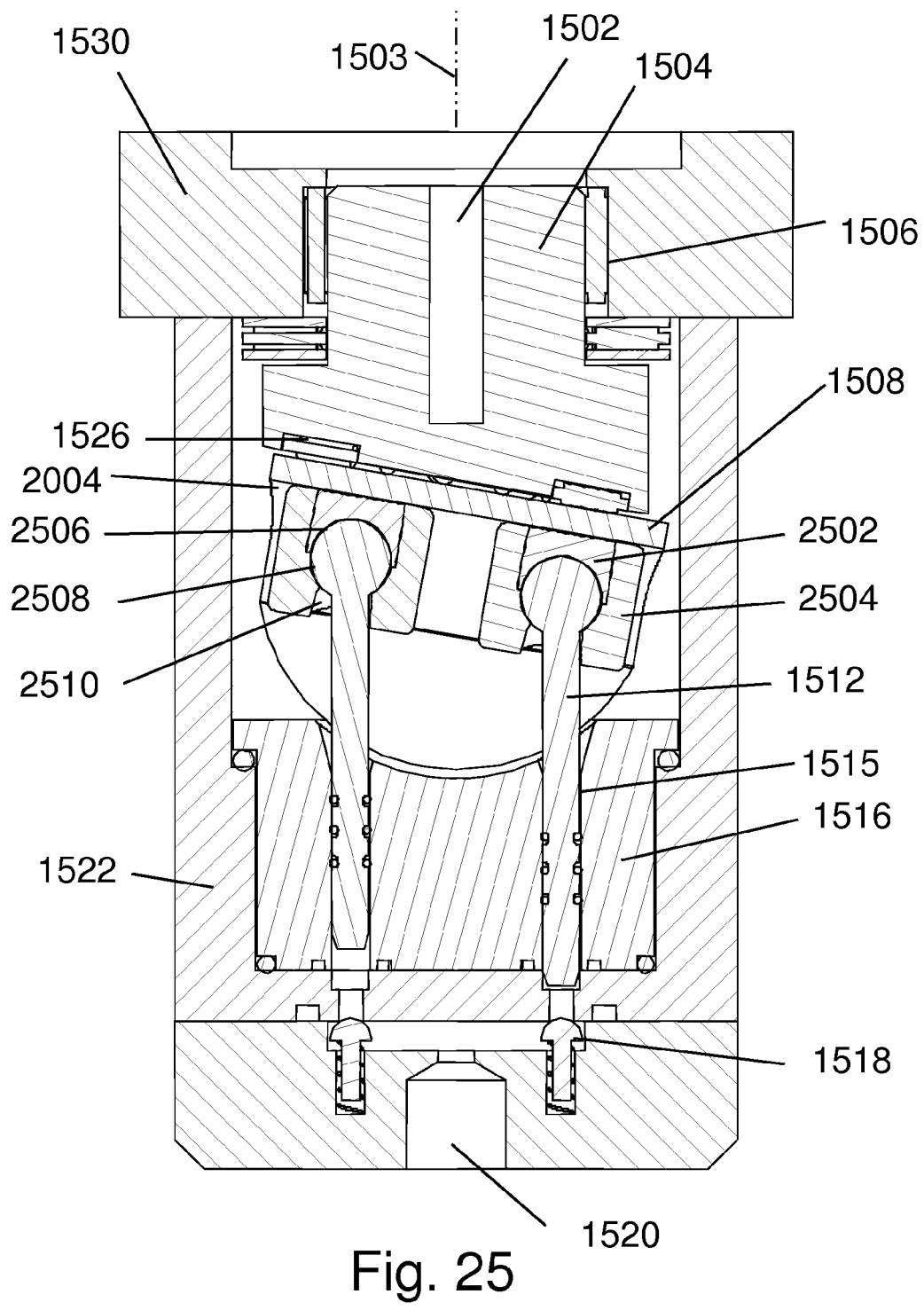
FIG. 25 is a cross section view of an alternative exemplary embodiment related to the exemplary embodiment of FIG. 15.

FIG. 25 is a cross section view of an alternative exemplary embodiment related to the exemplary embodiment of FIG. 15. Referring to FIG. 25, FIG. 25 shows an alternative piston end coupling shoe structure for coupling from the piston to the wobble carrier. The end coupling shoe structure comprises a cylindrical section (alternatively referred to as a shuttle) that holds a spherical end of the piston rod 1512. The cylindrical section 2504 comprises a cap plug 2502 fitting within the cylindrical section and providing a spherical mating surface 2506 for the top end of the piston spherical end. The cap plug 2502 fits within a cylindrical recess in the cylindrical section through the side of the cylinder forming the cylindrical section. The cap plug 2502 has a cylindrical profile for the top surface—opposite the piston spherical top. The cylindrical profile matches the curvature of the cylindrical section and fits within the cylindrical bore (FIG. 20, 2004) of the wobble carrier 1508. When installed in the wobble carrier bore 2004, the cylindrical section 2504 and cap plug 2502 are held in place by the constraint of the wobble carrier bore. The cap plug should preferably be close fitting within the cylindrical section bore, but need not be press fit, glued, or welded as the close fitting wobble carrier bore provides sufficient constraint to maintain operational configuration.

The cylindrical section can be seen to form a stepped through hole having three regions. The top region is a cylindrical hole 2506 for receiving the top cap 2502 and should preferably be close fitting to the top cap. Other shapes may be used, for example square, but cylindrical is advantageous for simple construction. The cylindrical hole at the top region should be large enough to insert the piston spherical end cap during assembly. The second section of the through hole forms an annular spherical bearing seat 2508 for the bottom annular part of the spherical piston end, next to the piston shaft. The third part of the through hole forms a connection aperture (hole) 2510 allowing the piston shaft to couple the spherical piston end to the piston portion within the cylinder. The connection aperture 2510 may preferably have a conical profile matching the wobble limits of the piston shaft portion. Alternatively a cylindrical hole may be provided.

The configuration of FIG. 25 may operate without a piston preload return spring. The wobble drive provides both push and pull action on the piston. As the motor turns the wobble hub 1504, the wobble carrier 1508 is tilted biaxially, i.e., left-right and front-back. The wobble carrier is constrained from rotating around the drive axis by the two pistons and rigid connecting shafts 1512 that constrain lateral motion relative to the pistons. Thus, the wobble carrier is constrained to nutate in place in response to the rotating wobble hub 1504. The nutating includes a rocking component in the plane of the two cylinders, i.e., the section plane of FIG. 25. The nutating motion transfers vertical motion to the pistons. During a downward push from the wobble hub 1504 (extension motion of the reciprocating drive), the force is transferred from the wobble hub 1504 to the cap plug 2502 and then to the spherical end 2404, and to the connecting rod 2408 to actuate the piston. The connecting rod 2408 lateral restraint enforces linear motion in the piston and piston spherical end, and prevents rotation of the wobble carrier 1508 around the drive axis 1503. The lateral restraint is provided by the cylinder walls 1515 in the spherical bearing component 1516. The linear motion constraint requires that the two piston ends and shuttles 2504 operate a varying distance apart related to $1/\cos \alpha$, where $\alpha$ is the tilt angle of the wobble drive diagonal surface in a plane containing the two piston axes (the plane of FIG. 25), where a perpendicular angle to the drive axis 1503 is reference zero degrees. This varying distance is accommodated by the wobble carrier bore and coupling shuttles 2504 that are free to slide axially in the wobble carrier bore.

During an upward pull (retraction motion of the reciprocating drive), the wobble hub 1504 drives the wobble carrier 1508 to pull the piston upward in the cylinder. This motion is coupled from the wobble carrier through the coupling shuttle 2504, which contacts the bottom of the spherical end of the piston rod through an annular spherical bearing seat section 2508 of the coupling shuttle. The piston rod extends through a coupling aperture 2510 in the side of the shuttle 2504. The coupling aperture 2510 typically needs to be slightly larger than the piston shaft diameter to accommodate the nutating motion. Accordingly, the aperture 2510 may be tapered or conical to match the nutation.

Additional variations may be noted in the partitioning. A top cylinder piece is provided that includes the spherical bearing seat for the wobble carrier, the cylinder and input ports and valve seat for the input. A single piece outer case and output valve seat is shown with a cavity for the top cylinder piece. A combined output valve carrier and nozzle structure is shown at the bottom of the sheet.

Figure 26:
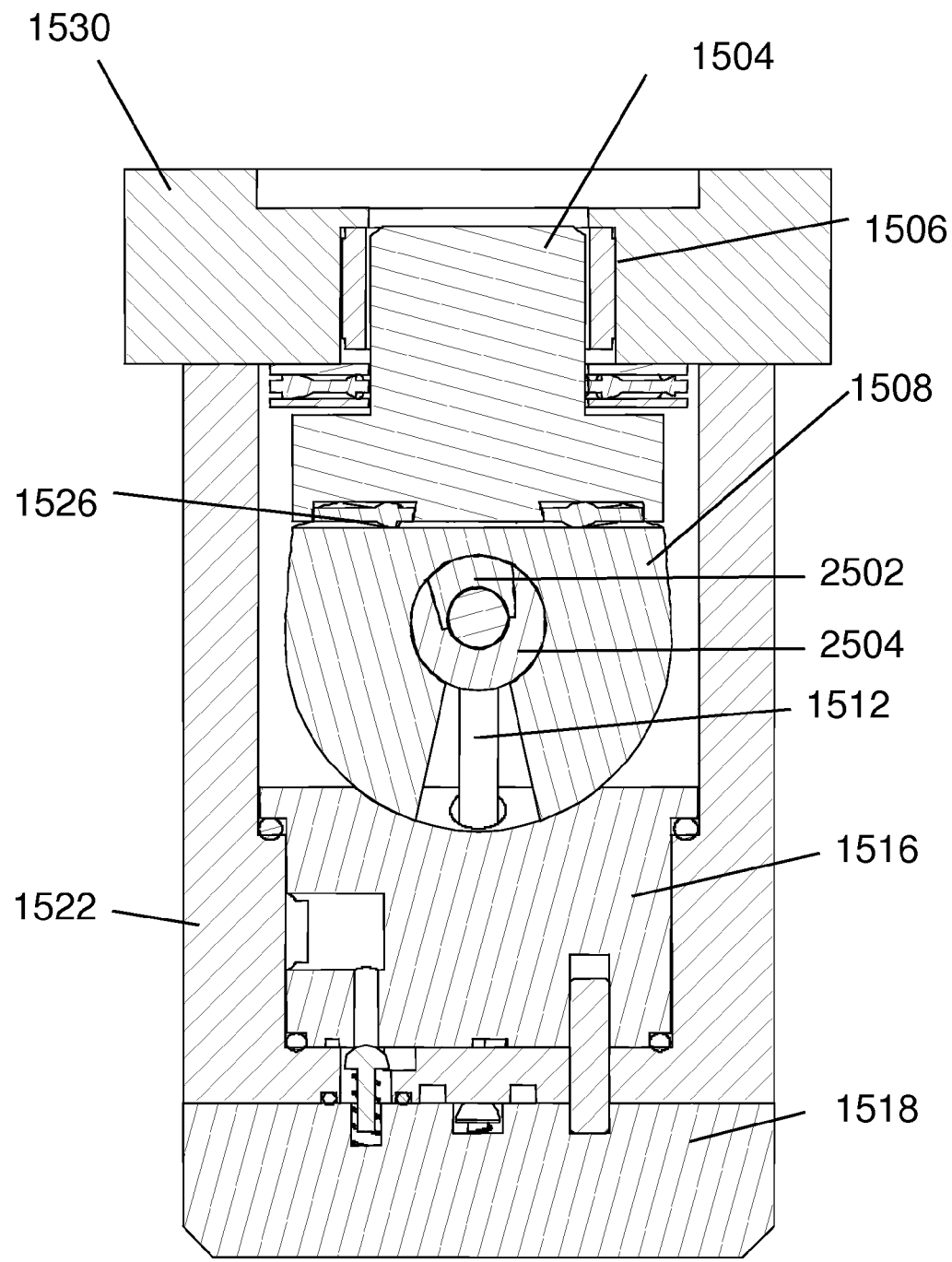
FIG. 26 shows a section view of the exemplary pump of FIG. 25 at a section rotated 90 degrees.

FIG. 26 shows a section view of the exemplary pump of FIG. 25 at a section rotated 90 degrees.

Figure 27:
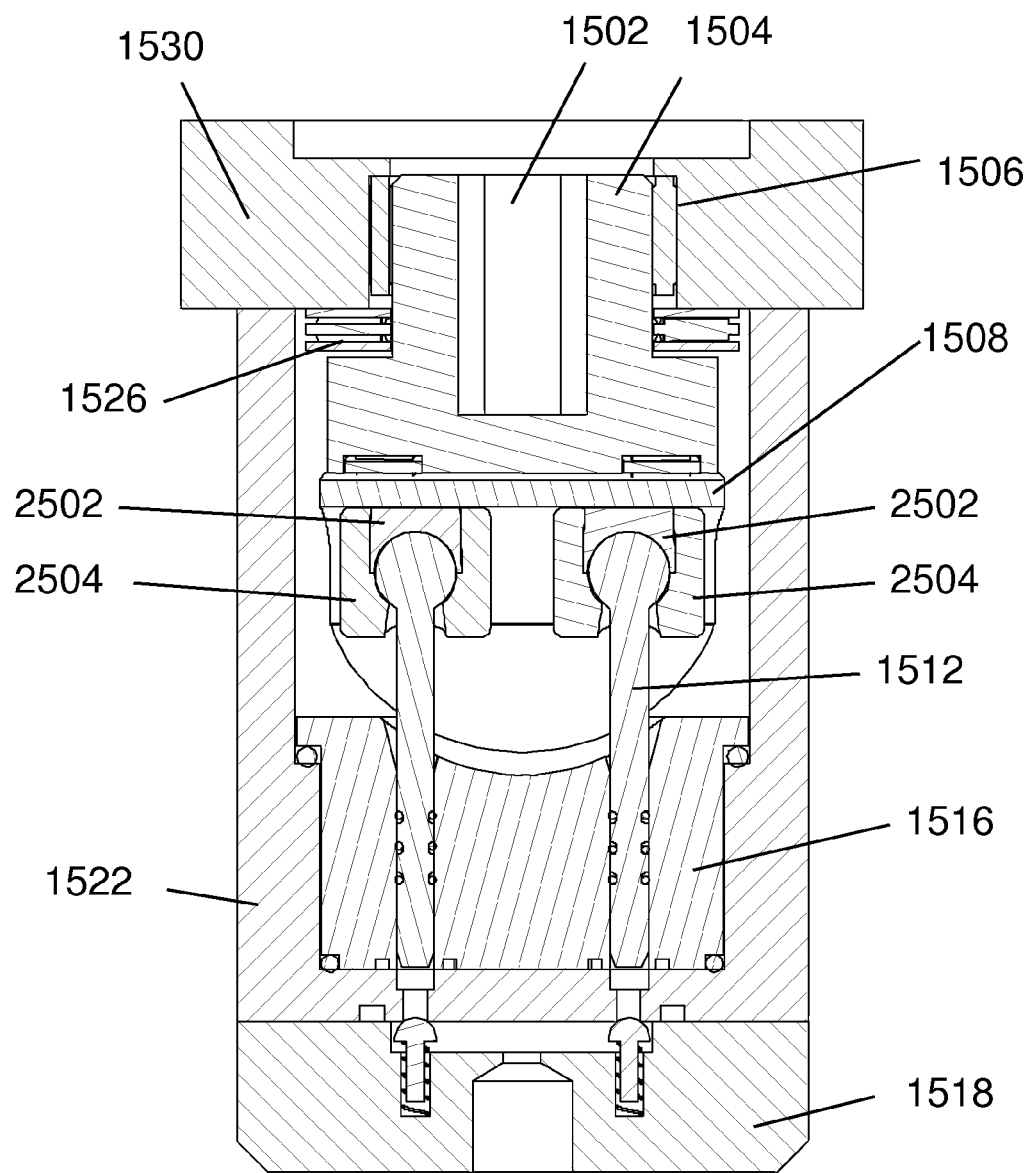
FIG. 27 shows a section view of the exemplary pump of FIG. 25 with the input wobble hub rotated 90 degrees.

FIG. 27 shows a section view of the exemplary pump of FIG. 25 with the input wobble hub rotated 90 degrees.

Figure 28:
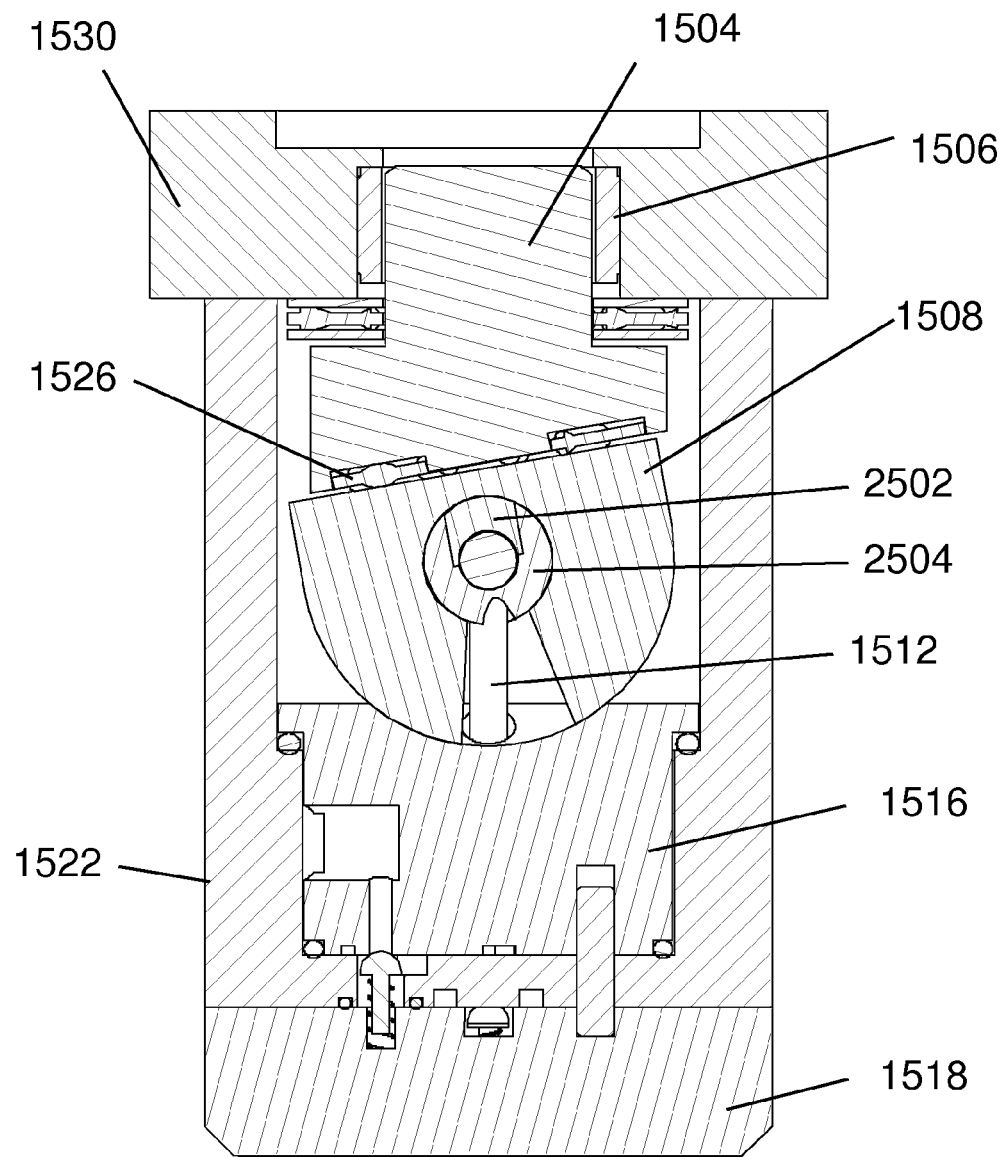
FIG. 28 shows a section view the exemplary pump of FIG. 27 at a section rotated 90 degrees.

FIG. 28 shows a section view the exemplary pump of FIG. 27 at a section rotated 90 degrees.

FIG. 29A and FIG. 29B show a top front right, and bottom back left view the exemplary coupling shuttle of FIG. 25. Referring to FIG. 29A, and FIG. 29B the exemplary shuttle 2504 as shown has a cylindrical surface 2902. Lateral to the cylindrical surface 2902 is a through hole having a cylindrical bore portion 2506, an annular spherical bearing seat portion 2508 and a coupling aperture 2510.

Figure 30A:
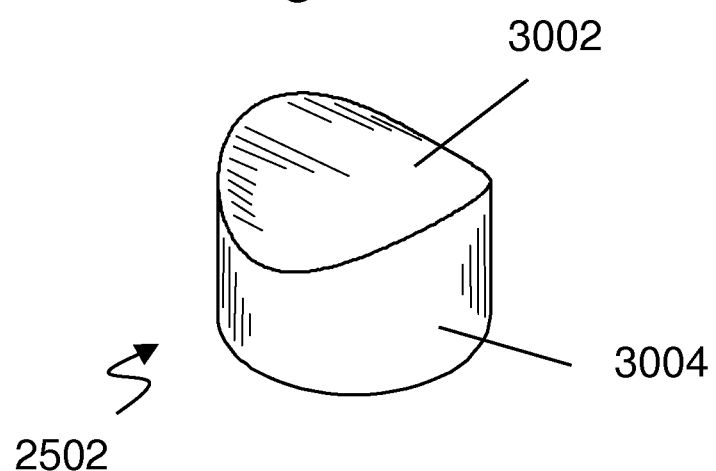
FIG. 30A and FIG. 30B show a top, front, right view and bottom, back, left view of the exemplary cap plug of FIG. 25.
Figure 30B:
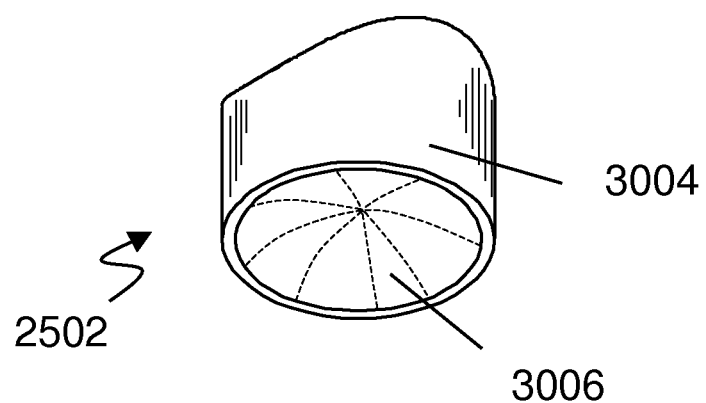

FIG. 30A and FIG. 30B show a top, front, right view and bottom, back, left view of the exemplary cap plug of FIG. 25. The cap plug 2502 has a cylindrical profile top surface 3002 for matching, fitting to, and sliding in the bore of the wobble carrier. The outer surface 3004 is sized to fit into the wobble shuttle. The diameter should be sufficient to pass the piston spherical head during assembly. A cylinder shape 3004 is shown. Other shapes may be used. Keys or notches (not shown) may optionally be provided to prevent rotation of the cap plug within the shuttle; however the curved top surface may be sufficient to maintain alignment. A bottom surface 3006 matches the top of the spherical end of the piston and forms a spherical bearing seat for the spherical end of the piston. Dotted contour lines in FIG. 30B indicate the spherical concave surface 3006.

In further variations, the cap plug 2502 may be larger in diameter or rectangular or may extend to the end of the shuttle. In a further alternative, the cap plug may be adapted to the bottom of the shuttle rather than the top as shown. When configure for the bottom, the cap plug would include the annular spherical bearing and piston rod aperture.

CONCLUSION

Relative terms such as "bottom" and "top" with respect to features shown in the drawings typically refer to the orientation of drawing features relative to the page and are for convenience of explanation only. The device itself may be operated in any orientation relative to gravity.

The present invention is described herein with reference to a pump embodiment. One may readily adapt the invention based on teachings herein for motor applications by adapting the valve arrangements leading to the cylinders. In a similar manner other reciprocating motion to or from rotational motion applications may be readily adapted from the teachings herein.

The present disclosure illustrates several variations using a fixed diagonal angle for the wobble drive; however, the invention may be adapted for variable diagonal angle by modifying the drive hub assembly to vary the diagonal angle according to a control such as, for example, a fluid or electric or lever control. The variable diagonal angle may be used to drive pistons for a variable displacement pump or motor.

While various embodiments of the present invention have been described above, it should be understood that they have been presented by way of example only, and not limitation. Thus, the breadth and scope of the present invention should not be limited by any of the above-described exemplary embodiments, but should be defined only in accordance with associated claims and their equivalents.

What is claimed is:

1. A wobble drive mechanism for coupling a rotary motion to a reciprocating motion comprising:
   a diagonal plate and a wobble carrier;
   said diagonal plate configured for coupling to a rotary motion drive in accordance with a rotary axis, said diagonal plate having a driving surface at a diagonal angle to said rotary axis, said diagonal plate for driving said wobble carrier;
   said wobble carrier having a first side, said wobble carrier in sliding contact with said diagonal plate along said first side, and said wobble carrier having a spherical side opposite said first side, said spherical side in contact with a spherical bearing recess; said wobble carrier operatively constrained between said diagonal plate and said spherical bearing recess; said wobble carrier having a wobble carrier bore disposed laterally to said wobble carrier;
   at least one reciprocating drive shoe contained within said wobble carrier bore; said reciprocating drive shoe free to move axially within said wobble carrier bore;
   said at least one reciprocating drive shoe coupled through a connecting rod for coupling said reciprocating motion.

2. The wobble drive mechanism in accordance with claim 1, further including a lateral restraint with respect to said connecting rod;
   wherein said wobble carrier is restrained from rotating around said rotary axis by said lateral restraint with respect to said connecting rod.

3. The wobble drive mechanism in accordance with claim 2, wherein the reciprocating drive shoe is partitioned into two or more components; said two or more components collectively include a top bearing portion proximal to the diagonal plate for coupling axial extension motion of said reciprocating motion, and further include a bottom bearing portion for coupling axial retracting motion of said reciprocating motion and further include an aperture for passing therethrough, said connecting rod for coupling said reciprocating motion.

4. The wobble drive mechanism in accordance with claim 3, wherein said two or more components of the reciprocating drive shoe are operatively held in place by walls of said wobble carrier bore and said coupling rod end coupling; wherein said walls of said wobble carrier bore prevent separation of said two or more components and said connecting rod end coupling prevents relative sliding of at least two of said two or more components.

5. The wobble drive mechanism in accordance with claim 4, wherein said two or more components of said reciprocating drive shoe comprises two half shoe components.

6. The wobble drive mechanism in accordance with claim 4, wherein said two or more components if said reciprocating drive shoe comprises a shuttle and an end cap.

7. The wobble drive mechanism in accordance with claim 6, wherein the shuttle forms a through hole in said shuttle, said shuttle capturing said end cap within a portion of said through hole, said shuttle having a bearing surface for coupling to said connecting rod end coupling within said through hole, said shuttle forming said aperture for passing therethrough said connecting rod.

8. The wobble drive mechanism in accordance with claim 1, further including a piston coupled to said reciprocating drive shoe, wherein the piston is coupled to said reciprocating drive shoe via a connecting rod, said connecting rod fixedly attached to said piston, and said connecting rod terminating in a double cylindrical bearing T section.

9. The wobble drive mechanism in accordance with claim 1, further including a piston coupled to said reciprocating drive shoe, wherein the piston is coupled to said reciprocating drive shoe via a connecting rod, said connecting rod fixedly attached to said piston, and said connecting rod terminating in a spherical ball end coupling.

10. The wobble drive mechanism in accordance with claim 1, wherein the spherical surface of the wobble carrier is based on a sphere having a center along a center axis of the wobble carrier bore.

11. The wobble drive mechanism in accordance with claim 1, wherein the spherical surface of the wobble carrier is based on a sphere having a radius sufficient to include within said sphere said reciprocating drive shoe at a maximum travel range for said reciprocating drive shoe within said wobble carrier bore.

12. The wobble drive mechanism in accordance with claim 1, wherein the spherical surface of said wobble carrier is interrupted to allow passage of said connecting rod through said spherical surface.

13. The wobble drive mechanism in accordance with claim 1, wherein a spherical surface of said spherical recess allows passage of said connecting rod through said spherical surface of said spherical recess.

14. The wobble drive mechanism in accordance with claim 1, wherein the spherical surface of the wobble carrier is based on a sphere having a radius greater than a width of the wobble carrier bore.

15. The wobble drive mechanism in accordance with claim 1, wherein said sliding contact with said diagonal plate includes an anti friction pad.

16. A wobble drive mechanism for coupling a rotary motion to a reciprocating motion comprising:
a diagonal plate and a wobble carrier;
said diagonal plate configured for coupling to a rotary motion drive at a rotary axis, said diagonal plate having a driving surface at a diagonal angle to said rotary axis, said diagonal plate for driving said wobble carrier;
  said wobble carrier having a first side, said wobble carrier in sliding contact with said diagonal plate along said first side, and said wobble carrier having a spherical side opposite said first side, said spherical side in contact with a spherical bearing recess; said wobble carrier operatively constrained between said diagonal plate and said spherical bearing recess; said wobble carrier having a wobble carrier bore parallel to said first side of said wobble carrier;
  coupling means for coupling a nutating motion of said wobble carrier to a connecting rod for coupling said reciprocating motion; said connecting rod having a connecting rod lateral restraint and relative axial freedom of motion.

17. The wobble drive mechanism as recited in claim 16, wherein said reciprocating motion is coupled to a piston for pumping.

18. The wobble drive mechanism as recited in claim 16, wherein said connecting rod is rigidly attached to said piston.

19. The wobble drive mechanism as recited in claim 16, wherein said connecting rod lateral restraint being effective to prevent rotation of said wobble carrier around said rotary axis.

20. The wobble drive mechanism as recited in claim 16, wherein said coupling means passes through a spherical surface section defining said spherical side of said wobble carrier.

21. The wobble drive mechanism as recited in claim 16, wherein said coupling means passes through a spherical surface section defining said spherical bearing seat.

22. The wobble drive mechanism as recited in claim 16, wherein said coupling means comprises shoe means slidable along a bore axis, said bore axis relative to said wobble carrier and parallel to said flat surface of said wobble carrier.

23. The wobble drive mechanism as recited in claim 16, wherein said shoe means divided into subcomponents held together in part by walls of a bore along said bore axis.

24. The wobble drive mechanism as recited in claim 16, wherein said shoe means further held together in part by a rod end coupling preventing relative sliding separation between at least two of said subcomponents; said rod end coupling coupled to said connecting rod.

* * * * *